United States Patent
Nezu et al.

(10) Patent No.: US 8,190,326 B2
(45) Date of Patent: May 29, 2012

(54) ON-VEHICLE APPARATUS AND CONTENT PROVIDING METHOD

(75) Inventors: Yoshiyuki Nezu, Tokyo (JP); Makoto Sasaki, Chiba (JP); Satoshi Yamazaki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/771,430

(22) Filed: Apr. 30, 2010

(65) Prior Publication Data

US 2010/0211901 A1 Aug. 19, 2010

Related U.S. Application Data

(62) Division of application No. 10/535,308, filed as application No. PCT/JP2004/013986 on Sep. 16, 2004.

(30) Foreign Application Priority Data

Sep. 25, 2003 (JP) .................................. 2003-332772

(51) Int. Cl.
*G06F 7/00* (2006.01)

(52) U.S. Cl. .......... 701/36; 701/538; 348/563; 348/564; 345/9; 345/156; 345/157; 345/158; 345/160; 345/173; 345/184; 715/767; 715/810; 715/830; 715/851; 715/853; 715/864

(58) Field of Classification Search ................ 701/1–18, 701/36, 200–226, 300–302; 340/990, 988, 340/995.1–995.28; 348/564–566; 345/7–9, 345/156–160, 163, 168, 184
See application file for complete search history.

(56) References Cited

U.S. PATENT DOCUMENTS

| | | | |
|---|---|---|---|
| 5,436,676 A | 7/1995 | Pint et al. | |
| 6,005,299 A | 12/1999 | Hengst | |
| 6,064,322 A * | 5/2000 | Ohira | 340/995.18 |
| 6,243,645 B1 | 6/2001 | Moteki et al. | |
| 6,484,094 B1 * | 11/2002 | Wako | 701/211 |
| 6,653,948 B1 | 11/2003 | Kunimatsu et al. | |
| 6,687,613 B2 * | 2/2004 | Yokota | 701/209 |
| 2001/0012980 A1 * | 8/2001 | Uchida et al. | 701/208 |
| 2003/0045979 A1 | 3/2003 | Ogasawara | |

FOREIGN PATENT DOCUMENTS

EP 0 701 926 A2 3/1996
(Continued)

OTHER PUBLICATIONS

U.S. Appl. No. 12/771,484, filed Apr. 30, 2010, Nezu, et al.

(Continued)

*Primary Examiner* — Jack W Keith
*Assistant Examiner* — Rami Khatib
(74) *Attorney, Agent, or Firm* — Oblon, Spivak, McClelland, Maier & Neustadt, L.L.P.

(57) ABSTRACT

The present invention is applied to, for example, a multimedia terminal having a function of navigation equipment and a function of playing back video and switches a display from a map display to a source display also with source switching operators 13P, 13R. In addition, menus of upper and lower hierarchies are simultaneously displayed to accept operations through a touch panel and a remote commander. In addition to a press-operable main rotary operator, a press-operable sub rotary operator is provided on a side surface. Among operations accepted through the main rotary operator, only a specific operation relating to content processing is accepted through the sub rotary operator.

6 Claims, 15 Drawing Sheets

FOREIGN PATENT DOCUMENTS

| | | |
|---|---|---|
| EP | 0 872 710 A1 | 10/1998 |
| EP | 1 004 230 A2 | 5/2000 |
| JP | 7-271809 | 10/1995 |
| JP | 10-214172 | 8/1998 |
| JP | 2000-268548 | 9/2000 |
| JP | 2001-143187 | 5/2001 |
| JP | 2002-286478 | 10/2002 |
| JP | 2003-157067 | 5/2003 |
| WO | WO 98/20303 | 5/1998 |
| WO | WO 99/49443 | 9/1999 |
| WO | WO 01/78054 A1 | 10/2001 |

OTHER PUBLICATIONS

Office Action dated Dec. 1, 2011, in European Patent Application No. 04 773 376.1, with English Translation.

* cited by examiner

FIG. 10

| MENU/NAVIGATION | | |
|---|---|---|
| DESTINATION | PERIPHERAL FACILITIES SEARCH | PLAY |
| | | SIGHT-SEEING /ACCOMMODATION |
| PLACE | NAME (KANA SYLLABARY) SEARCH | VEHICLE /TRANSPORTATION |
| INFORMATION | ADDRESS SEARCH | MEAL |
| | PHONE NUMBER SEARCH | |
| SETTING | GENRE SEARCH | SHOPPING |
| SETUP | PERSONAL NAME SEARCH | CULTURE |
| | MARK SEARCH | PUBLIC/LIVING |
| END | LATITUDE/LONGITUDE DESIGNATION SEARCH | |

ON-VEHICLE APPARATUS AND CONTENT PROVIDING METHOD

CROSS-REFERENCE TO RELATED APPLICATIONS

This application is a divisional application of and claims the benefit of priority from U.S. Ser. No. 10/535,308, filed May 18, 2005, the entire contents of this application is incorporated herein by reference. U.S. Ser. No. 10/535,308 is a National Stage application and claims the benefit of priority of PCT/JP04/013986, filed Sep. 16, 2004 which claims the benefit of priority from JP 2003-332772, filed Sep. 25, 2003.

BACKGROUND OF THE INVENTION

1. Technical Field

The present invention relates to an in-vehicle apparatus and a method of providing content, and is applicable, for example, to a multimedia terminal having a function of navigation equipment and a function of video playback. The present invention aims at improving usability to a user with respect to an apparatus and the like having a navigation function and a function of video playback, by enabling switching of a display from a display of map to a display of a source also through operation of a source switching operator, alternatively by displaying an upper hierarchical and a lower hierarchical menus simultaneously and accepting operations through a tough-panel as well as through a remote commander, and alternatively by providing a sub-rotary operator which is press-operable on a side surface, in addition to a main rotary operator which is press-operable, in order to cause this sub-rotary operator to accept only a specific operation relating to processing of content among operations to be accepted by the main rotary operator.

2. Background Art

Traditionally, in car navigation equipment that is an in-vehicle apparatus, a technique disclosed, for example, in Japanese Patent Application Publication Laid-Open No. Hei 10-141974 is applied so that menus are displayed in a hierarchical structure, and selection of the menus is accepted through a touch panel, thereby accepting operations of a user. In the car navigation equipment, it is configured that the selection of the menus in the hierarchical structure is also acceptable by the operation of a remote commander, so that it is able to operate the equipment through the remote commander, while the equipment is mainly operated through the touch panel.

In a monitor unit relating to video, such as a television receiver and the like, it is configured to accept switching of display objects by the operation of operators disposed on a control panel, and also by the operation of the remote commander.

By way of contrast, there has recently been proposed an in-vehicle apparatus having the navigation function and the video playback function as described above. Also in this in-vehicle apparatus, various operations of user are considered to be accepted by the operation of a touch panel and also by the operation of a remote commander.

However, in this in-vehicle apparatus, there is a problem that merely integrating conventional car navigation equipment and a user interface relating to a monitor unit degrades usability of the equipment.

Thus, the operation through the touch panel has an advantage that a desired menu is quickly selectable because a desired menu can be selected with a number of menus being displayed. However, there is a disadvantage that attention for safety is required in an application to an in-vehicle apparatus, because at the time of operation, it is necessary to turn the eyes toward a screen and watch the menus.

On the other hand, in the operation of the remote commander, it is able to operate by blind touch by assigning a dedicated function to each of the operators of the remote commander. Thereby, in an application to a car audio system, the burden of operation can be reduced than the operation through the touch panel. However, when selecting menus in the hierarchical structure, as in the car navigation equipment, it becomes necessary to ultimately operate by tracking a display relating to the operation of the touch panel. In this case, there is a disadvantage that operability deteriorates remarkably than the operation of the touch panel.

DISCLOSURE OF THE INVENTION

The present invention has achieved, in consideration of the foregoing points, and is to propose an in-vehicle apparatus and a method of providing contents relating to equipment and the like having a navigation function and a function of video playback, which is thus capable of improving usability to a user.

In order to solve the aforementioned problem, the present invention is applied to an in-vehicle apparatus which displays at least a map relating to navigation and video content from a plurality of sources, wherein in a state of displaying a map, when a source operator for switching sources is operated, the display of the map is switched to a display of video content, alternatively in a state of displaying the video content, when a map operator for instructing a display of map is operated, the display of the video content is switched to a display of map, and alternatively in a state of displaying the map, when the map operator is operated, the display of the map is switched to the display of the video content.

With a configuration according to an aspect of the present invention, which is applied to an in-vehicle apparatus having a function to display at least a map relating to navigation and video content from a plurality of sources, in a state of displaying a map, when a source operator for switching sources is operated, the display of the map is switched to a display of video content, that allows, even in a case of operation of switching from a map display to a content display, switching of displays therebetween in the same manner as the case of switching the sources. Alternatively, in a state of displaying video content, when a map operator for instructing a map display is operated, if the display of the image display is switched to a map display, and in a state of displaying the map, when the map operator is operated, if the display of the map is switched to the display of the video content, it is able, at the time of switching the display of the map with the map operator, to switch the display from the map to the source also by the operation of this operator. Thereby, it becomes possible to switch the display between the source and the map by operation of the source operator relating to source switching and also by operation of the map operator for instructing the map display. Accordingly, even in a case of accepting operations by an operation through a touch-panel and a remote commander, it is able to eliminate a burden on a user, improve operability and allow switching of the displays by a so-called blind touch, thereby improving usability to the user.

Further, according to the present invention as applied to an in-vehicle apparatus for providing content by accepting a selection of a menu in a hierarchical structure through operations of a touch panel and a remote commander, an upper hierarchical menu relating to menus in a hierarchical structure and a lower hierarchical menu corresponding to a selection in the upper hierarchical menu are displayed simultaneously, wherein as to operations through the touch panel, selection of any menu from the upper hierarchical menu and the lower hierarchical menu which are displayed simultaneously can be accepted, so as to switch the display of the lower hierarchical menu to a display of a menu corresponding to an upper hierarchical menu which was selected in the upper hierarchical menus, and wherein as to the operation through the remote commander, after switching a focus from a lower hierarchical menu to an upper hierarchical menu by operation of an operator toward the upper hierarchy, the focus is switched in the upper hierarchical menus by operation of a focus switching operator, then by operation of a selection operator, the display of the lower hierarchical menu is switched to the display of a menu corresponding to the upper hierarchical menu that is focused.

According to the present invention applied to an in-vehicle apparatus for providing content by accepting a selection of menus in a hierarchical structure through operations of a touch panel and a remote commander, an upper hierarchical menu relating to menus in a hierarchical structure and a lower hierarchical menu corresponding to a selection in the upper hierarchical menu are displayed simultaneously, wherein as to operations through a touch panel, any selection of menus in the upper hierarchical menu and the lower hierarchical menu which are displayed simultaneously is accepted, and if, by a selection of an upper hierarchical menu, the display of a lower hierarchical menu is configured to be switched to the display of a menu corresponding to the upper hierarchical menu which was selected, it is able, through the operation of the touch panel, to activate a desired menu quickly and reliably from among the menus in the hierarchical structure. Further, as to the operation of the remote commander, after switching the focus from a lower hierarchical menu to an upper hierarchical menu corresponding thereto by operation of an operator toward the upper hierarchy, a focus is switched in the upper hierarchical menus by operation of a focus switching operator, and by operation of a selection operator, the display of a lower hierarchical menu is switched to the display of a menu corresponding to an upper hierarchical menu which is focused, thereby enabling, in the operation through the remote commander, to reliably select a desired menu by switching the focus by tracking the hierarchical structure via the operations of a plurality of different kinds of operators. Thereby, it is able to display menus configured to be suitable to operation through the touch panel and operation through the remote commander so as to allow accepting the operation of a user through the touch panel and the remote commander, accordingly improving usability to the user.

Further, according to the present invention as applied to an in-vehicle apparatus having at least a navigation function and a function of providing contents, in which the operation is switchable by operation of a remote commander, menus relating to switching of operations between the navigation function and the content providing function are displayed, operations through a main rotary operator and a main backward operator are accepted, and among operations to be accepted through the main rotary operator and the main backward operator, such operations relating to provision of contents are configured to be accepted also by operation through a sub-rotary operator and a sub-backward operator.

According to a configuration of the present invention as applied to an in-vehicle apparatus having at least a navigation function and a function for providing content, in which operation is switchable by operation of a remote commander, there are displayed menus relating to switching between the navigation function and the function for providing the content, operations of a main rotary operator and a main backward operator are accepted, and an operation relating to provision of content among the operations to be accepted through the main rotary operator and the main backward operator is configured to be accepted also by operations of a sub-rotary operator and a sub-backward operator so that an operation suitable for blind touch among operations assigned to the side of the main rotary operator may be operated also by an operation on the side of the sub-rotary operator. Thereby, as to a specific operation, it is configured to be operable on the side of the sub-rotary operator, accordingly, even in such a case where an operation through operations of the touch panel and the remote commander is acceptable, or the like, it becomes possible to eliminate a burden on the user, and improve operability and usability to the user.

According to the present invention as applied to a method of providing content in an apparatus for displaying at least a map relating to navigation and video content from a plurality of sources, in a state of displaying a map, when a source operator for switching the sources is operated, the display of the map is switched to the display of video content, alternatively in a state of displaying video content, when a map operator for instructing display of a map is operated, the display of the video content thus regenerated is switched to the display of the map, and alternatively in a state of displaying the map, when the map operator is operated, the display of the map is switched to the display of the video content.

According to the present invention as applied to a method of accepting a selection by operations through a touch panel and a remote commander from menus in a hierarchical structure and providing content in response thereto, an upper hierarchical menu relating to the menus in the hierarchical structure and a lower hierarchical menu corresponding to a selection in the upper hierarchical menus are displayed simultaneously, wherein regarding the operation of the touch panel, it is configured to accept a selection of menu both from the upper hierarchical menu and the lower hierarchical menu which are displayed concurrently, and upon selection of a menu in the upper hierarchical menu, it switches the display of a lower hierarchical menu to the display of a menu corresponding to the menu selected in the upper hierarchical menu, and wherein regarding the operation of the remote commander, after switching a focus from a lower hierarchical menu to an upper hierarchical menu corresponding thereto by operation of an operator toward the upper hierarchy, the focus in the upper hierarchical menu is switched by operation of a focus switching operator, and the display of the lower hierarchical menu is switched to the display of a menu corresponding to the upper hierarchical menu that is focused by operation of a selection operator.

According to the present invention as applied to a method of providing contents in an apparatus having at least a navigation function and a function of providing contents, and switching functions by operation through a remote commander, a menu relating to switching of operations between the function of navigation and the function of providing contents is displayed, and operations through a main rotary operator and a main backward operator are accepted, wherein an operation relating to provision of contents among the operations acceptable through the main rotary operator and the main backward operator is configured to be accepted also by operations through a sub-rotary operator and a sub-backward operator.

Thereby, according to the configuration of the present invention, it is able to provide a method of providing content, which is capable of improving usability to a user.

According to the present invention, it is able to improve usability to a user with regard to an apparatus and the like, having, for example, a navigation function and a function of video playback.

BRIEF DESCRIPTION OF DRAWINGS

FIG. 10 is a plan view for explaining navigation in the in-vehicle apparatus of FIG. 1.

BEST MODES FOR CARRYING OUT THE INVENTION

Figure 1:
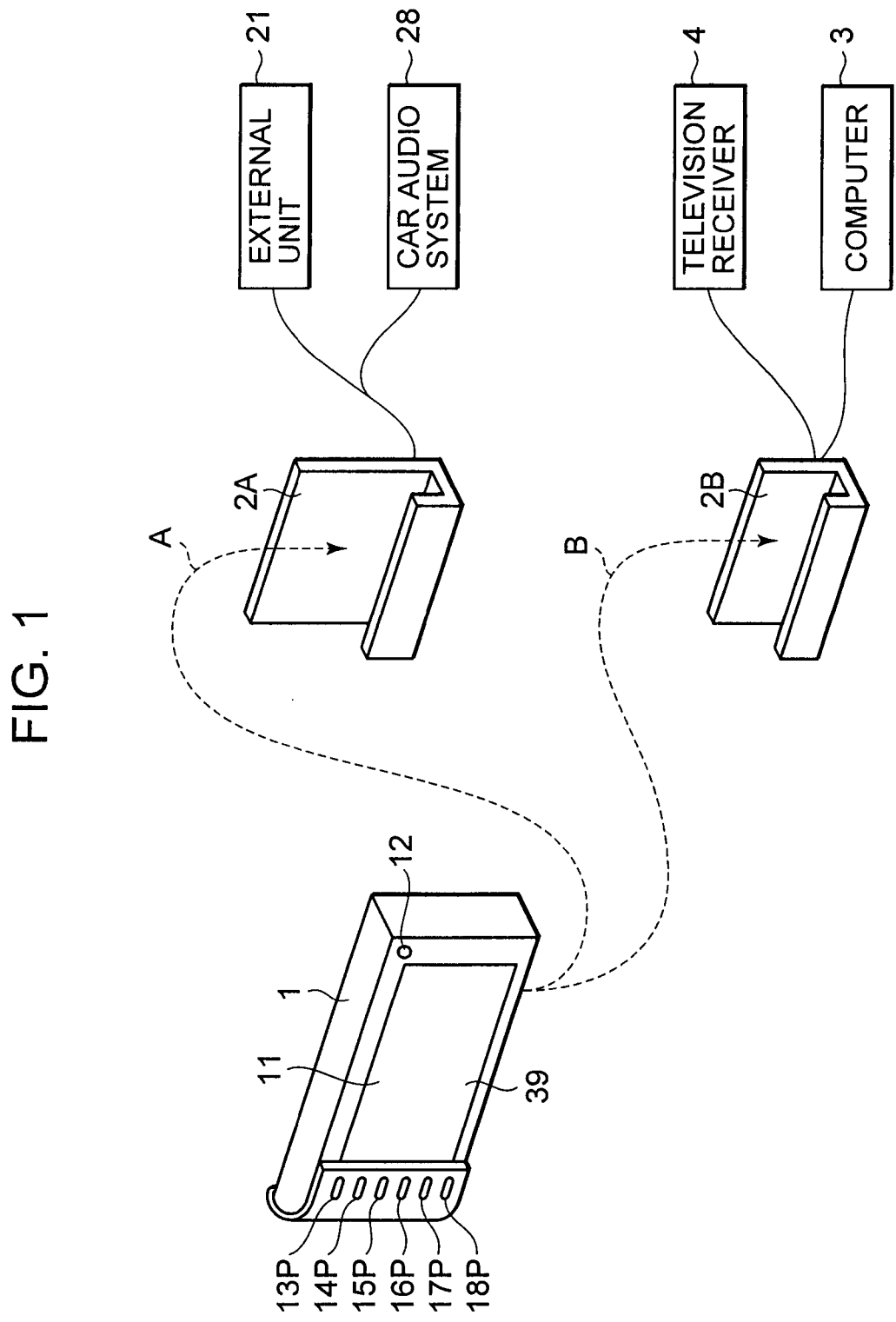
FIG. 1 is a perspective view showing an in-vehicle apparatus according to an embodiment of the present invention together with its peripheral configuration.

Preferred embodiments of the present invention will now be described in detail, while suitably referring to the drawings.
(1) Configuration of Embodiment
(1-1) Overall Configuration of In-Vehicle Apparatus FIG. 1 is a perspective view showing a content providing system relating to an in-vehicle apparatus 1 according to an embodiment of the present invention. The in-vehicle apparatus 1, which is a multimedia terminal having a function of a navigation unit and a function of a content providing unit for playing back audio and video, is formed in the shape of a plate having a predetermined thickness, and constructed so as to be usable by setting on an in-vehicle cradle 2A disposed in a center console of a vehicle, as indicated by an arrow A.

Thus, in the in-vehicle unit 1, terminals relating to input/output of various data and the like are disposed on a lower end face. In a case where the in-vehicle apparatus 1 is connected through the terminal of the lower end face to the in-vehicle cradle 2A, so that it is configured to receive power supply and the like, and be able to input and output further various data necessary for operation, and the like.

Alternatively, it is able to remove and bring back the in-vehicle apparatus 1 from the in-vehicle cradle 2A. For example, by setting on a home cradle 2B provided in house, the in-vehicle apparatus 1 is configured so as to be connectable via the home cradle 2B to a computer 3 and a television receiver 4, as indicated by an arrow B.

In the connection to the computer 3 via the home cradle 2B, the in-vehicle apparatus 1 is used to upload and download various files necessary for operations as a multimedia terminal. Therefore, the computer 3 is configured such that, in accordance with activation of an application corresponding to the in-vehicle apparatus 1, a predetermined file retained in the computer 3 is uploaded via the home cradle 2B to the in-vehicle apparatus 1, and conversely, a predetermined file is downloaded from the in-vehicle apparatus 1. The in-vehicle apparatus 1 is configured such that files relating to AV content, files of electronic mails, and files of maps used for navigation are applicable as a file used for such upload and download, and further, files of movies and television programs, etc., and music files are applied as the files relating to AV content.

On the other hand, in the connection with the television receiver 4 via the home cradle 2B, it is configured so as to function as a multimedia terminal and provide various contents to user via the television receiver 4, and further display a map on the television receiver 4 and execute processing such as route search relating to the function of navigation.

Accordingly, a display screen 11, on which the content and the like are displayed while in vehicle, is formed on a front surface, and a power switch 12 is disposed above on the right side of the display screen 11. In addition, on a control panel on the opposite side of the power switch 12, operators 13P to 18P of source, program, menu, display, and volume are disposed in an order from top to bottom.

Figure 2:
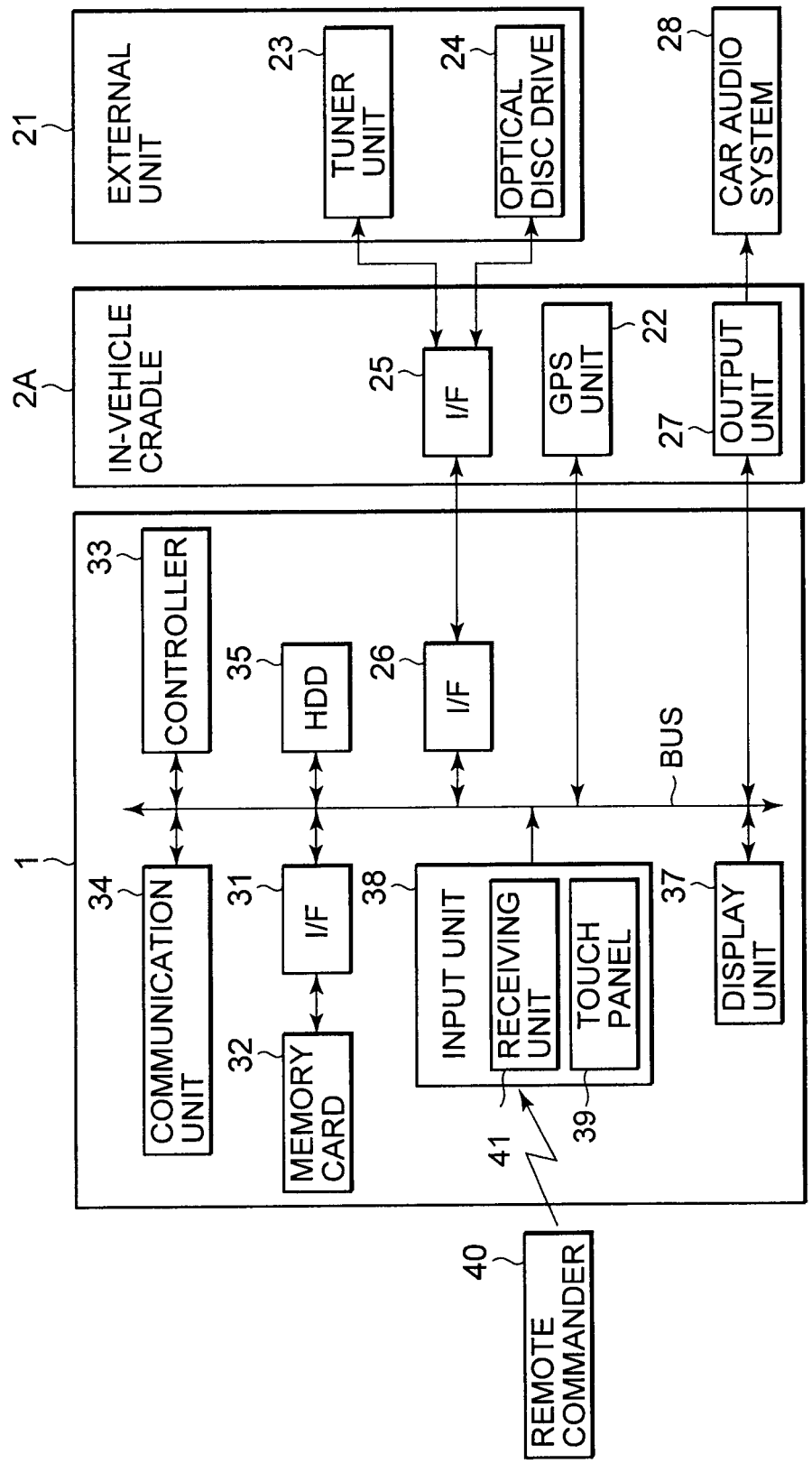
FIG. 2 is a block diagram of the in-vehicle apparatus of FIG. 1.

FIG. 2 is a block diagram showing the in-vehicle apparatus 1, together with its related configurations. The in-vehicle apparatus 1 is connected via the in-vehicle cradle 2A to an external unit 21. Here, the external unit 21 is disposed under a seat, for example, and there are disposed a tuner unit 23, an optical disc drive 24, and the like.

Here, the tuner unit 23 receives, under the control of the in-vehicle apparatus 1, television broadcast waves, and traffic information relating to vehicle information and communication system (VICS), and outputs to the in-vehicle cradle 2A video data, audio data, and traffic information according to the receiving results. Thereby, with the in-vehicle apparatus 1 set on the in-vehicle cradle 2A, it is able to enjoy television broadcasts, and also obtain the traffic information and notify a user of the information.

Under similar control of the in-vehicle apparatus 1, the optical disc drive 24 plays back optical discs such as digital versatile disc (DVD), and compact disc, etc., and outputs video data and audio data to the in-vehicle cradle 2A. Thereby, with the in-vehicle apparatus 1 set on the in-vehicle cradle 2A, it is able to enjoy AV content through various optical discs by AUX input.

On the other hand, the in-vehicle cradle 2A is provided with a GPS unit 22 and an audio output unit 27. Here, the GPS unit 22 is a current position detecting apparatus relating to global positioning system (GPS), and detects and outputs the current position under the control of the in-vehicle apparatus 1. Thereby, in a case of setting the in-vehicle apparatus 1 on the in-vehicle cradle 2A, it is able to execute navigation processing on the basis of information regarding the current position detected with the GPS unit 22.

The output unit 27 obtains audio data and voice data from the in-vehicle apparatus 1, converts these data to analog data, and outputs in FM broadcast waves or via an external output terminal. Thereby, in the in-vehicle apparatus 1, when it is set on the in-vehicle cradle 2A, it outputs audio signals and voice signals via audio output by wire or radio to car audio equipment 28 onboard the in-vehicle apparatus 1 so that the audio signals and the voice signals are outputted via this car audio equipment 28.

In the home cradle 2B, a similar output unit is disposed and configured so as to output, by wire, such audio signals, voice signals, and video signals. Thereby, with the in-vehicle apparatus 1 set thereon, it is able to provide various AV contents through the television receiver 4.

Accordingly, the in-vehicle apparatus 1 is provided with an interface 26, which is, by setting on the in-vehicle cradle 2A, connected to an interface 25 of the in-vehicle cradle 2A, and inputs and outputs various data relating to the external unit 21, with the interface (I/F) 25.

The interface 26 is configured so as to operate under the control of a controller 33 and, in a case where the in-vehicle apparatus 1 is set on the in-vehicle cradle 2A, input and output various data with respect to the external unit 21, and also input and output the data relating to this input and output, with a bus BUS. On the other hand, in a case where the in-vehicle apparatus 1 is set on the home cradle 2B, it is configured so as to input and output data relating to upload and download, with the computer 3.

Further in the in-vehicle apparatus 1, under the control of the controller 33, an interface (I/F) 31 inputs and outputs various data with a memory card 32, which is inserted from a card slot disposed on the side surface of the in-vehicle apparatus 1, and also inputs and outputs this data with the bus BUS. Thereby, the in-vehicle apparatus 1 is configured so as to be able to capture, for example, a still image obtained by a digital still camera via the memory card 32, and to the contrary, record the captured still image in the memory card 32.

A communication unit 34, which is a transmitting/receiving unit relating to wireless communication local area network (LAN), transmits data to be outputted to the bus BUS under the control of the controller 33 to the network, and also obtains desired data via the network, and outputs it to the bus BUS. Thereby, the in-vehicle apparatus 1 is configured so as to connect the Internet via the communication unit 34, and also transmit and receive electronic mails.

A hard disk drive (HDD) 35 records and holds programs and contents, etc., relating to the processing of the in-vehicle apparatus 1, and outputs these data to the bus BUS under the control of the controller 33. Thereby, the hard disk drive 35 is configured so as to hold the data of various files inputted from external equipment via the interfaces 26, 31, various data obtained via the communication unit 34, data outputted to this external equipment, data relating to electronic mails, etc., and output them to the bus BUS, as required. Here, it is configured such that this program is provided by previous install. Instead of this, it may be recorded in the hard disk drive 35 by downloading from a recording medium via the interfaces 36, 31, or by downloading from a network with use of the communication unit 34. In this case, as the recording medium, various recording media such as an optical disc, a memory card, and a magnetic tape are applicable widely.

A display unit 37, which is composed of, for example, a liquid crystal display for forming the display screen 11 described above with reference to FIG. 1, displays various contents, maps, etc., under the control of the controller 33.

An input unit 38 is composed of a structure relating to a touch panel 39 for detecting operations through a touch panel 39 disposed on the display screen 11, a receiving unit 41 for receiving remote control signals outputted from a remote commander 40, and an interface for detecting operations of operators 13P to 18P for sources, programs, etc. The input unit 38 notifies the controller 33 the operations of user that are detected by these. Thereby, the in-vehicle apparatus 1 is configured so as to execute switching of operations, and the like, by the operations of the operators 13P to 18P disposed on the side of the display screen 11, or the operation of the touch panel 39 disposed on the display screen 11, or the operation of the remote commander 40.

(1-2) Remote Commander

Figure 3:
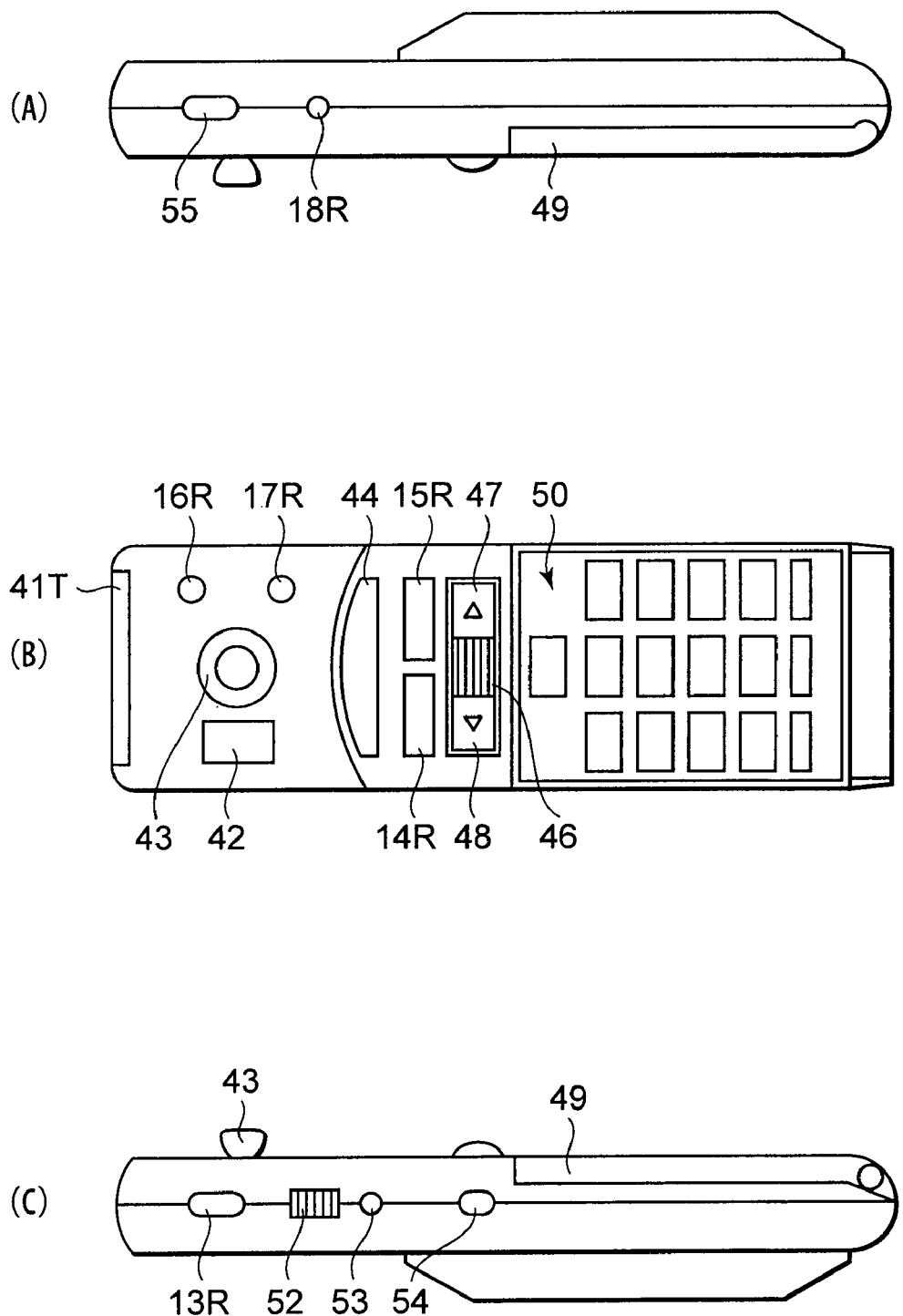
FIG. 3 includes a plan view and side views of a remote commander of the in-vehicle apparatus of FIG. 1.

FIG. 3 shows a plan view and a side view showing the remote commander 40. The remote commander 40 is formed in an elongate plate shape having a predetermined thickness, and has on one end face of the shorter-side thereof a light transmitter unit 41T for outputting remote control signals by means of infrared ray. In the remote commander 40, on the left side of the upper side surface than the side on which the light transmitter unit 41T is disposed, there is disposed an operator 42 composed of a seesaw switch used for switching between zoon-out and zoom-in in displaying maps. A joystick 43 that is a press-operable pointing device is disposed in the proximity of the operator 42. On the right side of the joystick 43, a display operator 16R, and a map operator 17R are disposed upward and downward directions, respectively. On the front side from these controllers, a current position operator 44 for instructing the display of the current position is formed horizontally. Thus in the remote commander 40, the operators 42, 43, 44, relating to navigation are collectively disposed in the proximity of the map operator 17R.

Further, in the remote commander 40, a program operator 14R and a menu operator 15R are disposed on the front side of the current position operator 44. A jog dial 46 (hereinafter referred to as a "center jog") that is a press-operable rotary operator is disposed at the center of further front side, and a backward operator 48 and a forward operator 47 are disposed on the left and right of the center jog 46. Thus, these operators 14R, 15R, 46 to 48 are operators relating to the menus displayed on the display screen 11, so that the operators relating to the menus are collectively disposed in this preferred embodiment.

In the remote commander 40, a cover 49 is disposed on a further near side of the center jog 46. The cover 49 opens to a front side. It is constructed such that an operator 50 comprising a plurality of keys relating to character input and numeric input such as a numerical keypad, a clear key, etc. can be operated by opening the cover 49.

Further, on one side surface of the remote commander 40, a source operator 13R, a jog dial (hereinafter referred to as a "side jog") 52, which is a rotary operator that can be pressed, a backward operator 53, and a source-off operator 54 are disposed from top to bottom. These operators 13R, and 52 to 54 are operators relating to playing back of audio video, that is, the operators relating to operations, possibly operated by so-called blind touch. Thus, the usability of the remote commander 40 can be improved by collectively disposing these operators 13R and 52 to 54 on one side surface.

Further, the remote commander 40 is configured to be provided with, on another side surface thereof, from top, a VICS operator 55 for instructing to display VICS traffic information and a volume operator 18R.

In response to the operations of these operators, the controller 33 (FIG. 2) executes a program recorded in the hard disk drive 35, thereby executing navigation processing and also providing various contents to the user, in response to the operations by the user.

That is, the controller 33, when receiving of television broadcasts is instructed by the user, instructs the tuner unit 23 via the interfaces 26, 25 to receive television broadcasts, and in response to an instruction from the user, instructs to switch receiving channels. Further, it causes video data and audio data obtained as received by the tuner unit 23 to be inputted via the interface 26, so that, as to the video data, it is displayed on the display unit 37. Further, as to the audio data, it is outputted to car audio equipment 28 via the output unit 27. Accordingly, the content relating to television broadcasts is configured to be provided to the user.

Alternatively, when a user instructs viewing of video content recorded in the hard disk drive 35, the controller 33 instructs the hard disk drive 35 to play a file relating to the video content, and provides video data and audio data outputted from the hard disk drive 35 to the user, as in the case of receiving television broadcasts. Alternatively, when the user instructs playback of music content recorded in the hard disk drive 35, the controller 33 similarly instructs the hard disk drive 35 to play the music content, and causes the output unit 27 to output audio data outputted from the hard disk drive 35. If during these processing, the user instructs switching of the content as a playback target, the controller 33 changes the file read from the hard disk drive 35 to repeat similar processing.

Alternatively, when the user instructs display of a map, current position information is obtained from the GPS unit 22, and map data recorded in the hard disk drive 35 is loaded with reference to the current position information. In addition, based on the loaded map data, a map is displayed on the display unit 37.

Alternatively, when viewing and listening of content relating to AUX input is instructed, the controller 33 controls via the interface 26 the operation of the optical disc drive 24 to obtain data relating to video content and music content outputted from the optical disc drive 24. In addition, the obtained data of the video content and the music content are processed in respective units to provide these contents to the user. Further, based on the instruction of the user, the content so obtained is recorded in the hard disk drive 35.

Alternatively, when browsing on the Internet is instructed, the controller 33 activates a browser software to connect the Internet through the communication unit 34, and displays video and the like obtained through the communication unit 34 on the display unit 37, and outputs voice data from the output unit 27. Alternatively, when processing relating to electronic mails is instructed, the controller 33 activates mailer software to display on the display unit 37 electronic mails held in the hard disk drive 35, and obtains via the communication unit 34 the electronic mails to be displayed. In addition, the controller 33 accepts the input of electronic mail by the user, and sends this electronic mail via the communication unit 34.

Alternatively, when viewing of a still image is instructed, the controller 33 obtains a still image file of a processing target by accessing to the memory card 32 via the interface 31, or accessing to the hard disk drive 35, and displays a still image relating to this still image file on the display unit 37. In addition, on the basis of the instruction of the user, the controller 33 inputs and outputs this still image file between the memory card 32 and the hard disk drive 35, or deletes it from the record of the memory card 32 and the hard disk drive 35.

Alternatively, when the user instructs navigation processing, the controller 33 accepts the input such as destination and the like by the user, and obtains the current position information from the GPS unit 22, and then executes route search processing, on the basis of this information. In response to the setting made by the user, the controller 33 outputs various information so as to perform route guide of the user on the basis of the route so detected.

The controller 33 executes these processing by executing a program recorded in the hard disk drive 35. When the user presses the power switch 12 to turn off the power of the in-vehicle apparatus 1, the controller 33 records and holds the state at the time of power-off. Alternatively, the power is turned on by the operation of the power switch 12 or by press-operation of the joystick 43 in the remote commander 40 so that the recorded and held state during the power fall is reproduced.

(1-3) Processing by Controller

Figure 4:
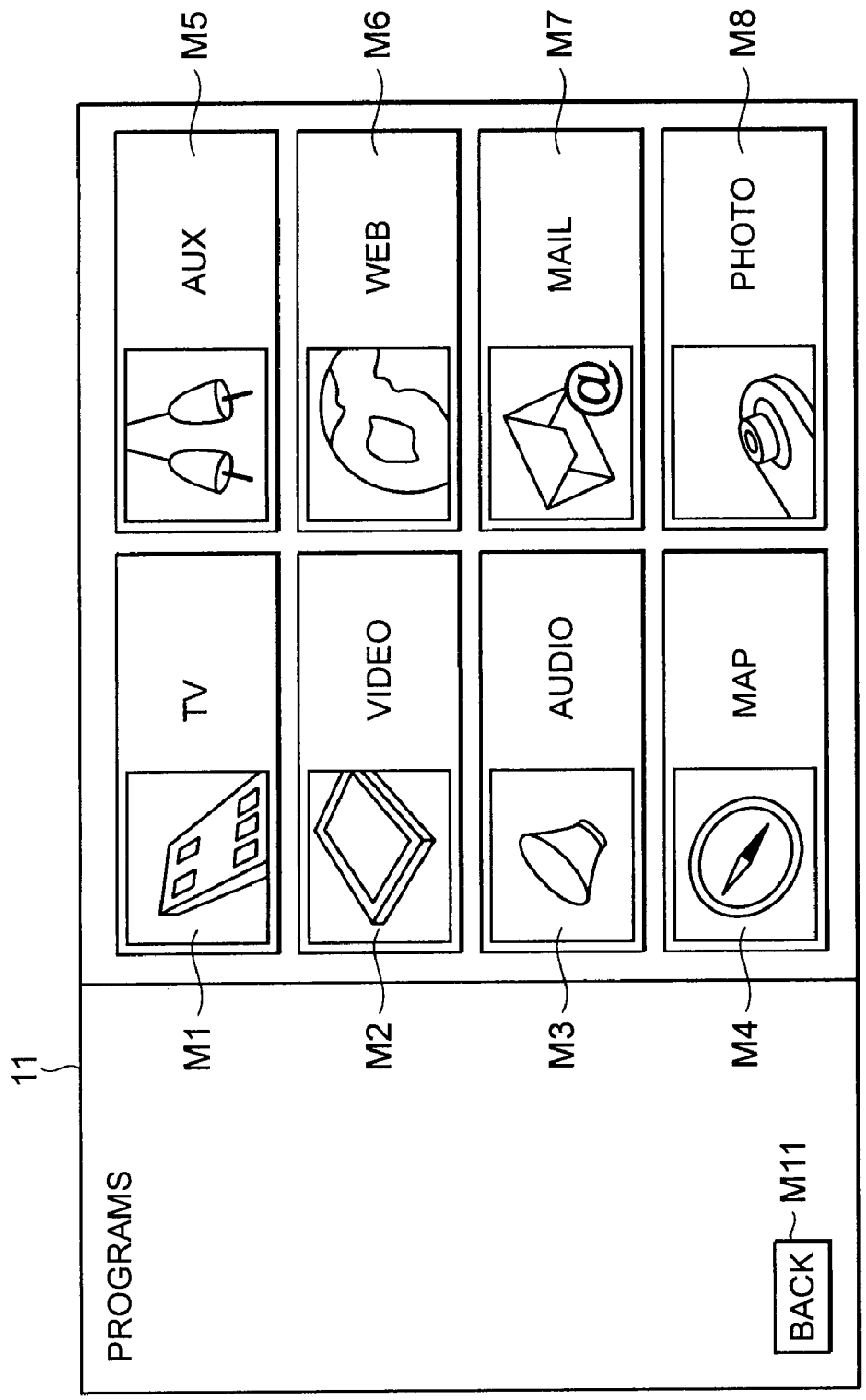
FIG. 4 is a plan view showing a program menu screen for a touch panel of the in-vehicle apparatus of FIG. 1.

FIG. 4 is a plan view showing a touch panel program menu screen that is displayed on the display screen 11 by the control of the controller 33. Here, this touch panel program menu screen is a menu screen suitable for operation through the touch panel 39. In this embodiment, it is configured to also prepare a remote commander program menu screen that accomplishes the same function as the touch panel program menu screen and is suitable for the operation through the remote commander 40. The controller 33 displays the touch panel program menu screen in a case where it can be judged that the operation of user instructing the display of this program menu screen is intended for the operation through the touch panel 39.

Specifically, if the program operator 14P disposed on the control panel of the in-vehicle apparatus 1 is operated, or in a case where the menu to go backward is selected through the touch panel 39 on the display screen relating to a lower hierarchy of this program menu screen, or further, in a case where the operation by the user on a portion other than the menus is detected in a state of displaying the program menu screen relating to the remote commander, which will be described later, the controller 33 displays the touch panel program menu screen.

Here, the program menu screen is a main menu screen relating to selection of content to be provided to the user, and the like, and is formed by displaying a menu of selectable applications in the in-vehicle apparatus 1. Here, as a program menu screen, there are displayed a TV menu M1 to instruct receiving of television broadcasts, a Video menu M2 to instruct playback of video content recorded in the hard disk drive 35, an Audio menu M3 to instruct playback of audio content recorded in the hard disk drive 35, a Map menu M4 to instruct display of a map, an AUX menu M5 to instruct playback of contents relating to AUX input, a WEB menu M6 to instruct activation of a browser relating to the Internet, a Mail menu M7 to instruct processing relating to electronic mails, and a Photo menu M8 to instruct processing of a still image. There is also displayed a menu M11 to back to the state immediately before this program menu screen.

On this program menu screen, among these menus M1 to M11, the menus M1 to M8 relating to the selection of applications have the same size. Since none of the menus M1 to M8 is provided with a cursor or the like indicating a focus, they are aligned and displayed. This has user percept that any of these menus M1 to M8 can be selected by the operation of the touch panel 39. Thereby, if any one of the menus M1 to M8 on this program menu screen is selected by the operation of the touch panel 39, the controller 33 controls the entire operation so as to execute the corresponding processing.

If the back menu M11 is selected and operated in the state of displaying this program menu screen, the display screen is switched to the last display. On the other hand, if the center jog 46 of the remote commander 40 is operated in the state of displaying this program menu screen, the display screen is switched to the remote commander program menu screen.

Figure 5:
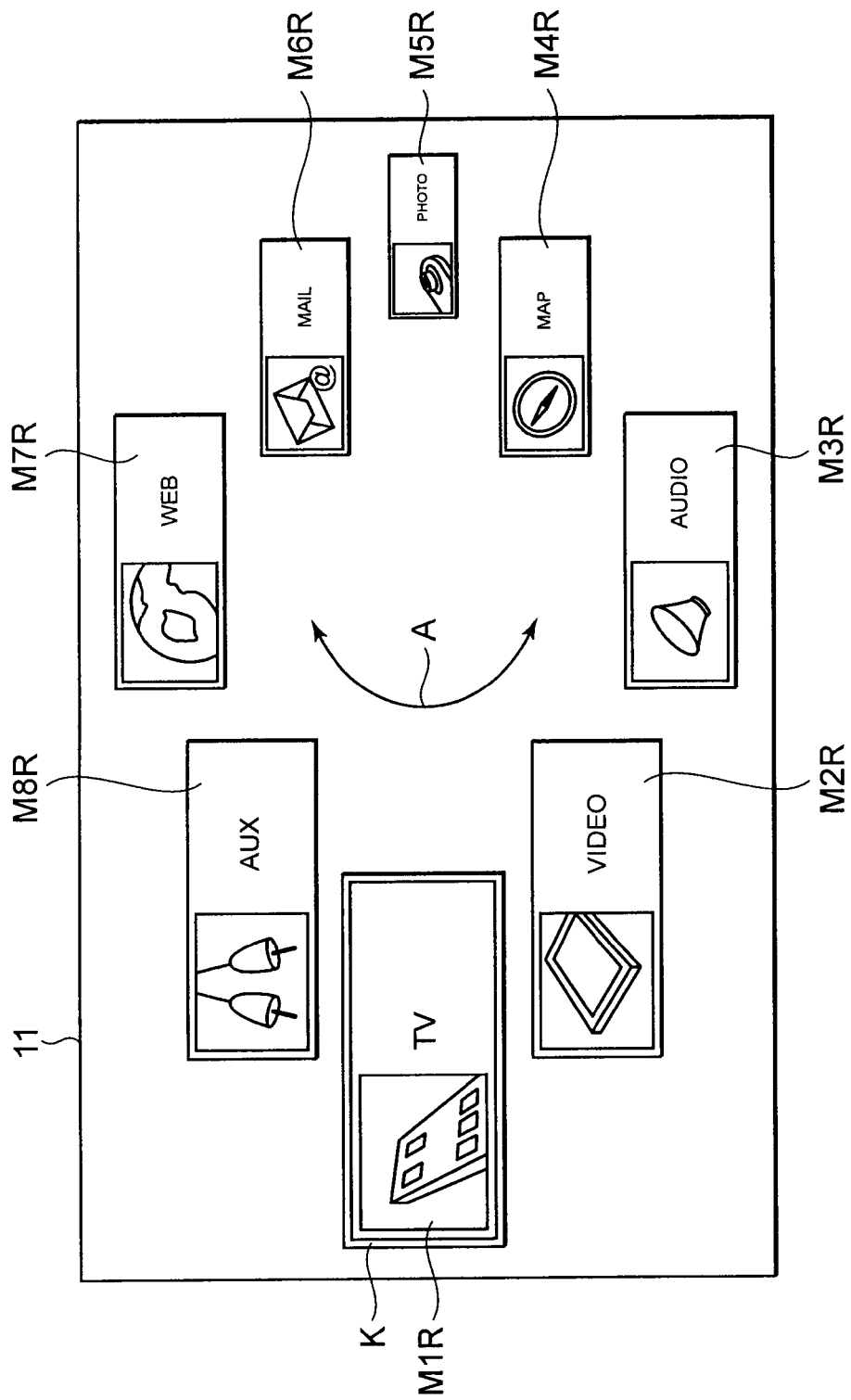
FIG. 5 is a plan view showing a program menu screen for the remote commander of the in-vehicle apparatus of FIG. 1.

Meanwhile, FIG. 5 is a plan view showing the remote commander program menu screen. The controller 33 displays this remote commander program menu screen in a case where it can be judged that the operation of the user instructing the display of this program menu screen is intended for the operation through the remote commander 40.

Specifically, if the program operator 14R disposed at the remote commander 40 is operated in the state of providing content to user, and the like, or in a case where the backward operator 48 of the remote commander 40 is operated in the state of displaying a display screen relating to a lower hierarchy of this program menu, the controller 33 displays this remote commander program menu screen. In addition, as described above, it also displays this remote commander program menu screen in a case where the center jog 46 is operated in the state of displaying the touch panel program menu screen.

Here, this remote commander program menu screen is formed by displaying a menu of applications selectable with the in-vehicle apparatus 1, as in the program menu screen relating to the operation of the touch panel. Further, menus M1R to M8R of respective application programs are displayed by the same design as the program menu screen relating to the operation of the touch panel 39. Thereby, in the in-vehicle apparatus 1, menu screens are switched so as to reliably select a desired application.

In this remote commander program menu screen, these menus M1R to M8R are arranged and displayed in the form of a ring, with a menu M1R disposed leftmost having a largest size, and other menus M2R to M8R being displayed in a smaller size as they move away from the leftmost menu M1R. Further, in the menu M1R configured to be displayed the largest, a cursor K by means of a bounding box indicating setting of a focus is displayed.

Therefore, on this program menu screen relating to the operation of the remote commander 40, the controller 33 is configured to display as to which application can be selected immediately, together with other selectable menus.

Thus, if the center jog 46 disposed at the remote commander 40 is rotationally operated in the state of displaying this program menu screen relating to the operation of the remote commander 40, the controller 33 rotates the display position of the menus M1R to M8R in response to the direction of rotation of the center jog 46, as indicated by an arrow A, and also changes the size of the respective menus M1R to M8R so as to correspond to the rotation of the display position. Thereby, the focus of a menu can be switched in response to the user's operation of the remote commander 40. Alternatively, if the center jog 46 is further press-operated, or if the forward operator 47 of the remote commander 40 is operated, the controller 33 controls the entire operation so as to execute the application relating to a focused menu (for example, in FIG. 5, the menu located at the leftmost).

Thereby, in this in-vehicle apparatus 1, the menu screen suitable for operation through the touch panel 39 and the menu screen suitable for operation through the remote commander 40 are configured to be switchable depending on each case of operation by the user to operate through the touch panel 39 or to operate through the remote commander 40, so as to improve usability to the user. Further, respective cases for the user if he/she intends to operate the touch panel 39 or the remote commander 40 are judged from the operation at the time of transition to this menu screen, or from the operation by the user in the state of displaying these menu screens, so as to be able to provide a user interface appropriate to the operation of the user.

If one of the menus M1R to M8R is selected by the operation of the touch panel 39 on this remote commander program menu screen, the controller 33 controls the entire operation so as to execute the application relating to the menu selected in response to the selection of the menus. On the other hand, if the operation on a portion other than the menus M1R to M8R is detected with the touch panel 39, the display is switched to the touch panel program menu screen.

FIG. 6(A) is a plan view showing a main display screen relating to the menu M2 displayed in accordance with the instruction as described above. In this case, the controller 33 displays the image of content at an area except for a strip portion on the lower side of the display screen. At this time, the controller 33 records and holds the file relating to the menu M2 played back last time, and the played back status of this file and the like (so-called last memory). In accordance with this record, the controller 33 plays back and provides the user the corresponding content from the position at which playback is suspended. Thereby, the in-vehicle apparatus 1 is configured so as to easily view desired content from the position at which the last viewing is suspended.

On the other hand, various menus relating to this application are displayed at a strip region in a lower end of this display screen, together with information related to the image that is being displayed. Hereinafter, this strip display is called "control bar". Specifically, an OFF menu M21 for instructing termination of this application, which also functions as a back menu, is displayed on the leftmost of a control bar B1. The controller 33 causes this application to be terminated by the operation of the OFF menu M21 through the touch panel 39, and switches the display to the touch panel program menu screen. Subsequently, a title, which is attribute information of the content being displayed, is displayed at the control bar B1. Here, if the length of this title is longer than the length of the region for displaying the title, the controller 33 displays the title to be visible by scrolling. Subsequently, various operation menus are displayed by right justification at the control bar B1.

Here, a rewind menu M22, a back-to-previous-chapter menu M23, a playback/pause switching menu M24, a forward-to-next-chapter menu M25, a fast forward menu M26, a list display menu M27, a switching menu M28 for switching display/non-display of the control bar B1 are displayed in sequence on this operation menu. When the operation of each of these menus is detected by the operation of the touch panel 39, the controller 33 controls the operations of respective units so as to correspond to the operation by the user.

Alternatively, when the center jog 46 of the remote commander 40 is operated with the control bar B1 so displayed, or in a case where the display is switched to a display screen relating to the menu M1 by the operation of the remote commander 40, the controller 33 displays a cursor on one of the menus M21 to M28 by means of a bounding box, and displays the menu focused by this cursor. Further, the controller 33 switches focuses in sequence among the menus M21 to M28 by moving in sequence this cursor by the rotational operation of the center jog 46. In addition, by the press-operation of the center jog 46, or by the operation of the forward operator 47, the controller 33 accepts selection of the focused menu, and controls the operations of respective units, as in the menu selection through the touch panel 39. On the other hand, in a case where the back operator 48 is operated through the remote commander 40, similarly to a case where the OFF menu M21 is selected, the controller 33 switches the display to the program menu screen. In this case, the controller 33 switches the display to the remote commander program menu screen.

In the control relating to these menus M21 to M28, in a case where the user selects the list display menu M27, the controller 33 switches the entire display to a list screen as shown in FIG. 6(B). Here, this list screen is a list display of content, etc. selectable by the user. A title specifying an application is displayed on an upper part of the screen, and a setting menu M275 to execute various settings relating to this application is displayed on the right corner of the display of this title. In addition, a backward menu M271, a cabinet menu M272, a play list menu M273, and a video capsule menu M274 are disposed in sequence on the left side of the screen. Here, the cabinet menu M272 is a menu for instructing so-called list display of folders. Upon the selection of this menu M272, a list of selectable folders is displayed on the list display on the right side. The play list menu M273 is a menu for instructing the list display of selectable content about the currently selected folder through such a list of folders, or the like. By this menu selection, the list of selectable content is displayed on the list display on the right side. The video capsule menu M274 is a menu for instructing display of a thumbnail image about one of the content on the list display.

A region for displaying this thumbnail image is disposed at the center of this list screen. In a case where the video capsule menu M274 is not selected, the content currently played back is displayed at this region.

In addition, menus of a lower hierarchy, which correspond to the menus M271 to M274 of the upper hierarchy disposed on the left side, are displayed on the right side of the display region of this thumbnail image on this list screen. Specifically, there is formed a list display of contents and folders corresponding to the menu M271 to M274 selected by the user. Immediately after displaying this list screen, a list, including the menu of content currently played back on this list display, is displayed. Here, this list display is to be formed by displaying the titles of respective contents and the names set on a folder on the menu. Therefore, the example of FIG. 6(B) is the case where this list indicates the list of contents relating to the play list menu M273. In a case where all of the lists of selectable content and folders cannot be displayed at the display region of this list, the controller 33 displays the selectable content and folders visible by scrolling of this list display, and also indicates by an arrow the direction in which scrolling is possible, on the left side of this list. Therefore, in the example of FIG. 6(B), upward and downward arrows are provided to indicate that the list of content exists extending beyond above and below the display region.

Also in this case, the controller 33 displays a scroll bar B2 on the right side of this list display, and also displays menus MU, MD for instructing upward and downward scrolls, respectively, on the top and the bottom of the scroll bar B2. Further, the control bar B1 is also displayed on a lower part of the screen on this list screen. In this list, the focused menu is displayed so as to project to the left.

The controller 33 switches list displays and the like by controlling the operations of respective units so as to correspond to the menu selected by the user, in selecting these menus M271 to M275 through the touch panel 39, and the menus of the control bar B1. In other words, if the user selects one of list displays so displayed, by the operation of the touch panel 39, the content to be played back is switched to the user-selected contents, and backs to the original display screen (FIG. 6(A)). At this time, in a case where the video capsule menu M274 is selected by the user, it displays a still image of the content selected by this user, on the display region for the thumbnail image, and switches the content to be played back to the user-selected contents by the user's operation of the touch panel 39 within this display region, or by selecting again this content through the touch panel 39, and then backs to the original display screen. Similarly, in response to the user's selection through the touch panel 39, it displays the list of content with regard to the folder selected by the user in accordance with the selection of the play list menu M273.

Thus, on this display, the menus of the upper hierarchy and the lower hierarchy are displayed at the same time. Thereby, in the operation through the touch panel 39, it is able to directly select any menu of the upper hierarchy and the lower hierarchy, without tracking the hierarchical structure. On the other hand, in the operation through the remote commander 40, a desired menu can be selected by switching focuses while tracking the hierarchical structure. Therefore, the same menu screens as the touch panel 39 and the remote commander 40 are provided so as to improve usability to the user.

In these processing, when the operation of the scroll bar B2, and the menus MU, MD are detected, the controller 33 causes the list display to be scrolled by this operation . . . That is, if the menu MU for instructing an upward scroll is operated, the list display is scrolled upwardly. To the contrary, if the menu MD for instructing a downward scroll, the list display is scrolled downwardly. Whereas about the scroll bar B2, a list display is scrolled to the side operated by the operation of dragging.

This enables to reliably select a desired menu even in a case where the menus of the upper hierarchy and the lower hierarchy are displayed at the same time, and all of the menus cannot be displayed. Thus, in the in-vehicle apparatus 1, the size of screen used for display is limited, so that a slight increase in the number of contents causes the cases where all the menus cannot be displayed. The application to the in-vehicle apparatus 1 enables to improve usability to user.

Thus, with regard to the operation through the remote commander 40, if the center jog 46 of the remote commander 40 is operated with the list screen so displayed, or in a case where the display is switched to this list screen by the operation of the remote commander 40, the controller 33 displays the menu on which the focus is set, by switching a background color in these menus M271 to M275. It also switches focuses by these menus M271 to M275, in response to the rotational operation of the center jog 46. In response to the operation of the forward operator 47, or in response to the press-operation of the center jog 46, it switches the focus to the display relating to the list display, and indicates the focus by similar switching of background colors.

Thus, with the focus set on the list display, the controller 33 switches focuses in sequence in response to the rotational operation of the center jog 46, and scrolls the list display such that the menu so focused is always displayed. In the state of such focusing, in response to the operation of the forward operator 47, or in response to the press-operation of the center jog 46, the controller 33 accepts the selection of content and folder by the user, and switches the playback target to the selected content, and switches the folder as a selection target. To the contrary, when the backward operator 48 is operated, it switches the setting of focuses to the menus M271 to M275.

Accordingly, the in-vehicle apparatus 1 is configured such that desired content can be selected and viewed from video content stored in the hard disk drive 35 by the operation of the touch panel 39, or by the operation of the remote commander 40.

In the in-vehicle apparatus 1, various setting screens are displayed by the selection of the setting menu M275 set on the screen of FIG. 6(B), or by the setting through the menu screen displayed by the operation of the menu operators 15R, 15P. It is settable so as not to display the control bar B1 by the operation of the menu set on this setting screen. Alternatively, it is also settable so as not to display the control bar B1 by the operation of the menu M28 shown in FIG. 6(A).

FIG. 7(A) is a front view showing a main display screen in a case where it is configured so as not to display the control bar B1, in contrast to FIG. 6(A). When the operation of the touch panel 39 is detected in a condition that the control bar B1 is not displayed, a control bar B11 is displayed, as shown in FIG. 7(B). Thereby, in displaying attribute information as information related to images, the in-vehicle apparatus 1 is configured so as not to display it for a time period during which the attribute information is not required, but display it only when necessary, at a corner of the screen. This effectively avoids complexity of display in order to provide a user interface relating to a simple display.

By setting the timing of displaying such information related to images at the timing corresponding to the operation of the user, it is able to provide this attribute information to the user at his/her desired timing, thereby improving usability to the user.

Here, the control bar B11 is, in contrast to the corresponding control bar B1 (FIG. 6(A)), configured so as not to display the menus M21 to M27, which are the OFF menu M21, and the menus of the rewind, the back-to-previous chapter, the switching of playback/pause, the forward-to-next chapter, the fast forward, and the list display. However, it displays the title of content, and the switching menu M28 for switching display/non-display of the control bar B11.

In a case where no operation of user is detected after an elapse of a certain period of time since the display of the control bar B11 is so started, or when the switching menu M28 is operated to close the display window, the controller 33 terminates the display of the control bar B11 and displays the original screen (FIG. 7(A)). Thereby, in the in-vehicle apparatus 1, the menus relating to the operations of the touch panel 39 and the remote commander 40 are retreated from the display screen 11 when they are not required, and contents are displayed in order to effectively use the display screen 11.

Figure 7:
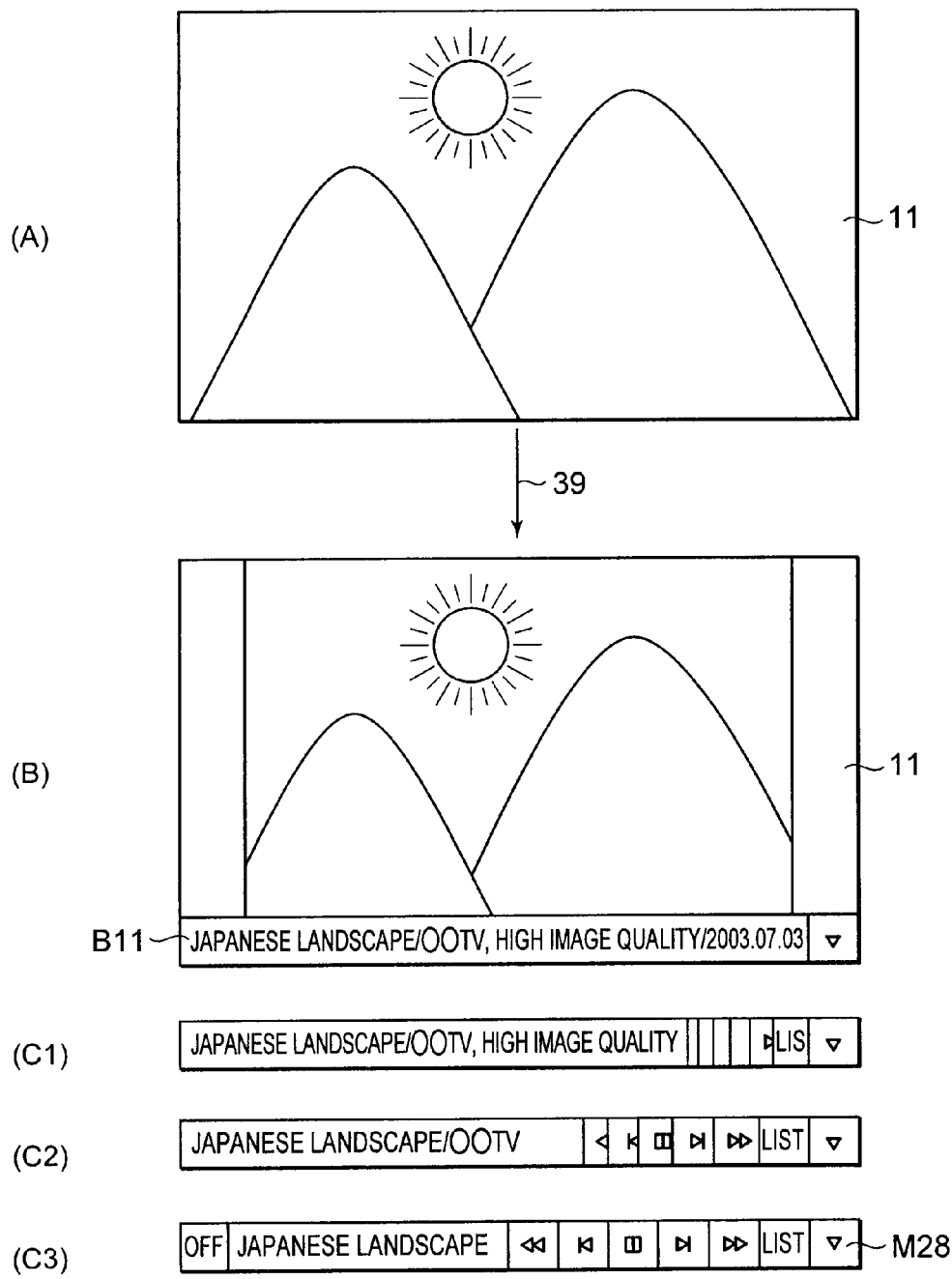
FIG. 7 shows plan views for explaining a control bar in the main screen of FIG. 6.

On the other hand, when the operation on a portion other than the switching menu M28 to close the display window of the control bar B11 is detected, the menus M21 to M27 which have been hidden from the display screen are displayed. The display changes at this time are as shown in FIGS. 7(C1) to 7(C3). Gradually from the right end at the menu M28, the menus M22 to M27 are moved and displayed to the center, in order to display these menus M22 to M27, as if the menus M22 to M27 hidden under the menu M28 appeared and moved to a visible position. When the menus M22 to M27 are displayed in this way and the display region for titles is not enough, the titles are scrolled to be displayed. The operation of the user is accepted with the menus M21 to M28 displayed in this way.

Thereby, in the in-vehicle apparatus 1, with regard to the display of the control bar B11, the display of menus is switched between a state of overlapping a plurality of menus and a state of arranging the overlapped menus, so that the region for displaying attribute information and the region for displaying the plurality of menus are variable. This also enables that the attribute information and the menus are suitably displayed so as to be user-friendly, in order to simplify the display.

When the center jog 46 of the remote commander 40 is operated with the control bar B1 so set in the non-display state, the controller 33 displays the control bar B11 displaying all the menus M21 to M28. Also in this case, if no operation of the user is detected after a certain period of time has passed since the display was started, or if the switching menu M28 is operated to close the display window, the controller 33 terminates this display of the control bar B11. With the control bar B11 displayed, the focus is displayed to accept the operation through the remote commander 40, as in a case of regularly displaying the control bar B11.

In a case where the menu M1 for instructing viewing and listening of television broadcasts is selected on the program menu screen, the controller 33 displays contents, the control bar, and the like, in accordance with the record of the last memory, as described above with reference to FIG. 6(A) to FIG. 7(B), and also switches the contents relating to the broadcasts, in response to the operation of user. Therefore, in this case, a menu for instructing up and down of the channels, a menu for instructing the display of a list of contents that can be viewed on an electronic program table and the like are displayed at the control bar, together with the titles of contents. In addition, with regard to selectable contents, a list of programs is provided which is based on the electronic program table obtained via the communication unit 34.

Also in this display relating to the television broadcasts, the controller 33 displays the control bar display/non-display menu. By the selection of this menu, or by the operation of the menu set on this menu screen, it is set so as not to display the control bar. The controller 33 accepts the operation of user by displaying contents while setting so as not to display the control bar, as above described with reference to FIG. 7, the control bar is displayed by the operation of the touch panel 39 or the operation of the remote commander 40, or further by displaying the menus. Thus, in the in-vehicle apparatus 1, even in a case of providing the content of television broadcasts, the menus relating to the operations of the touch panel 39 and the remote commander 40 are retreated from the display screen 11, and contents are displayed so as to effectively use the display screen 11.

Figure 8:
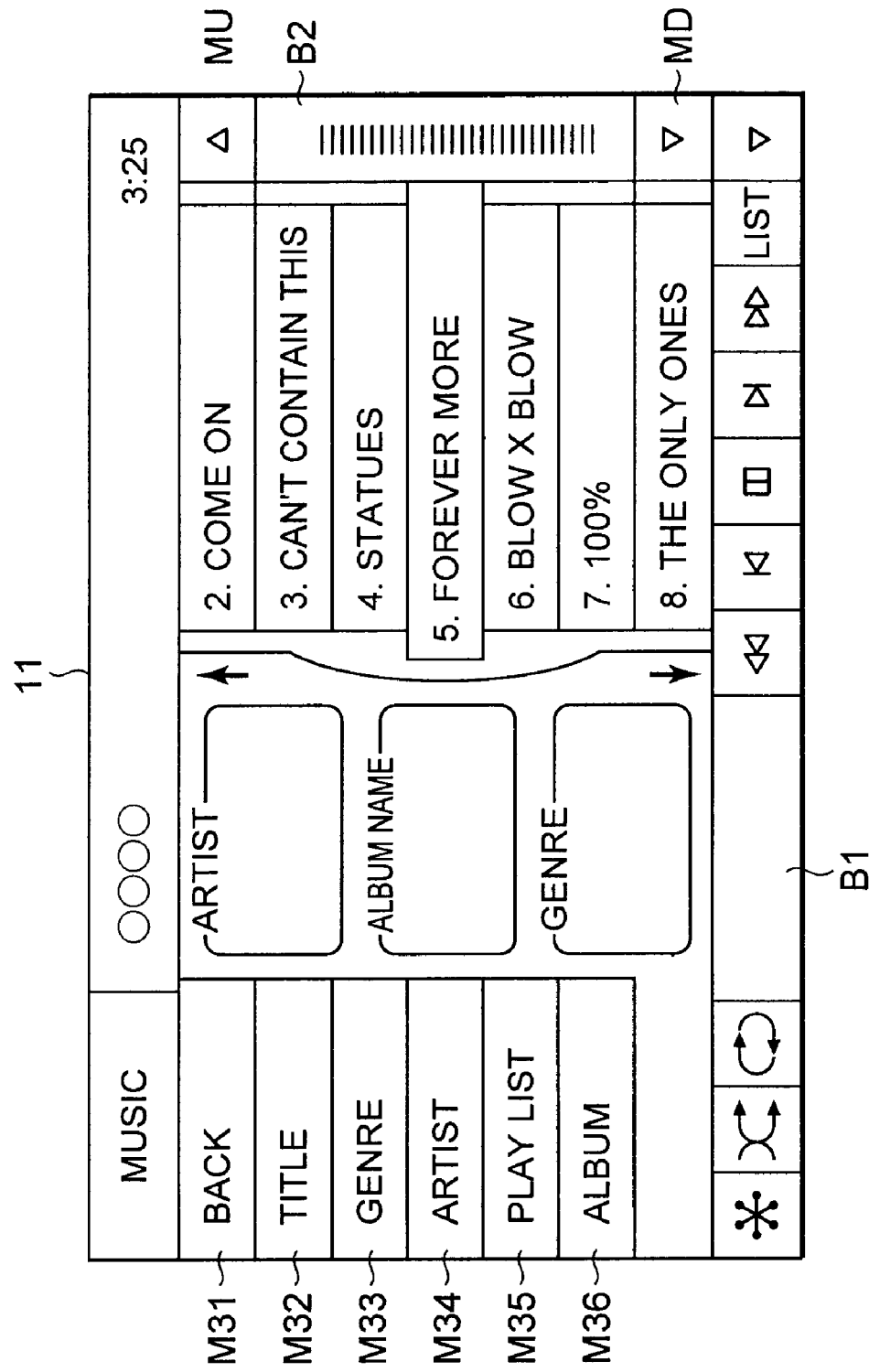
FIG. 8 is a plan view showing the main display screen relating to provision of music content in the in-vehicle apparatus of FIG. 1.

FIG. 8 is a plan view showing a main display screen of music content relating to the menu M3 on the program menu screen. By the selection of the menus M3, M3R, the controller 33 plays back music content recorded in the hard disk drive 35 in accordance with the record of the last memory, and provides it to the user. At this time, the controller 33 displays this display screen.

In this case, the controller 33 displays a title indicating music content provision, at a strip portion on the upper side of the display screen. Further, a Back menu M31, a Title menu M32, a Genre menu M33, an Artist menu M34, a Play list menu M35, and an Album menu M36 are displayed in sequence on the left side of the screen. Here, the music content recorded in the hard disk drive 35 is recorded so that it can be classified by title, genre, artist, play list, and album. In accordance with this classification, the controller 33 displays a list of the music content recorded in the hard disk drive 35 at a list display column on the right side, in response to user's selection of the menus M32 to M36.

On this display screen, a display column of an artist name, an album name, etc., relating to such selection is formed at the center, and a list of providable content relating to each classification is displayed on the next right column. In a case where all of selectable content cannot be displayed on the display region of this list, the controller 33 displays the selectable content by scrolling of this list display, and also indicates by the arrow the direction in which scroll is possible, on the left side of this list. Therefore, in the example of FIG. 8, upward and downward arrows are provided to indicate that the list of contents exists extending beyond above and below the display region. Also in this case, the controller 33 displays the scroll bar B2 on the right side of this list display, and also displays menus MU, MD for instructing upward and downward scrolls, respectively, on the top and the bottom of the scroll bar B1. Further, the control bar B1 is also displayed on a lower part of the screen on this list screen. In this list, the focused menu is displayed so as to project to the left.

By the operation of these menus M31 to M36 through the touch panel 39, and the operation of the list display control bar B1, the controller 33 switches content as a playback target so as to correspond to the selection operation of user, in the same manner as above described with reference to FIG. 6 and FIG. 7. Also in this case, the upper hierarchical menus and the lower hierarchical menus are displayed at the same time, so that the operations through the touch panel 39 and the remote commander 40 are accepted. When the operations of the scroll bar B2, and the menus MU, MD are detected, the controller 33 scrolls the list display in accordance with this operation. Therefore, in a case where the menus of a plurality of hierarchies are displayed at the same time and all of the menus cannot be displayed, the menus that cannot be displayed are displayed to be visible by scrolling.

Further on this display screen, a visualizer menu for switching a wall paper composed of animated images, which is displayed at the display region of artist names, a menu for instructing shuffle playback, and a menu for instructing repetitive playback are disposed in sequence on the left end of the control bar B1. The menus of rewind, back-to-previous-title, fast forward, list, control bar display/non-display are displayed in sequence on the right side.

Thus, immediately after displaying this display screen, the controller 33 displays, with regard to the music content currently provided to user, a list of content relating to the album being played back. By the operation of the list menu disposed at the control bar B1, the display of the above-mentioned list display column can be switched from the list display of titles currently played back to a list display of providable contents. In response to this display switching, the focus is switched from the menus of the control bar B1 to the menus M31 to M36, with respect to the operation of the remote commander 40. Thereby, the menus of three hierarchies, including the control bar B1, are displayed on this display screen of the music content.

Thus, relating to the control bar B1, the controller 33 is configured to accept the operations through the touch panel 39 and the remote commander 40, and switch the entire operation in the same manner as described above. As a result, in this case, the menus of the three hierarchies are directly selectable in the operation through the touch panel 39.

Figure 9:
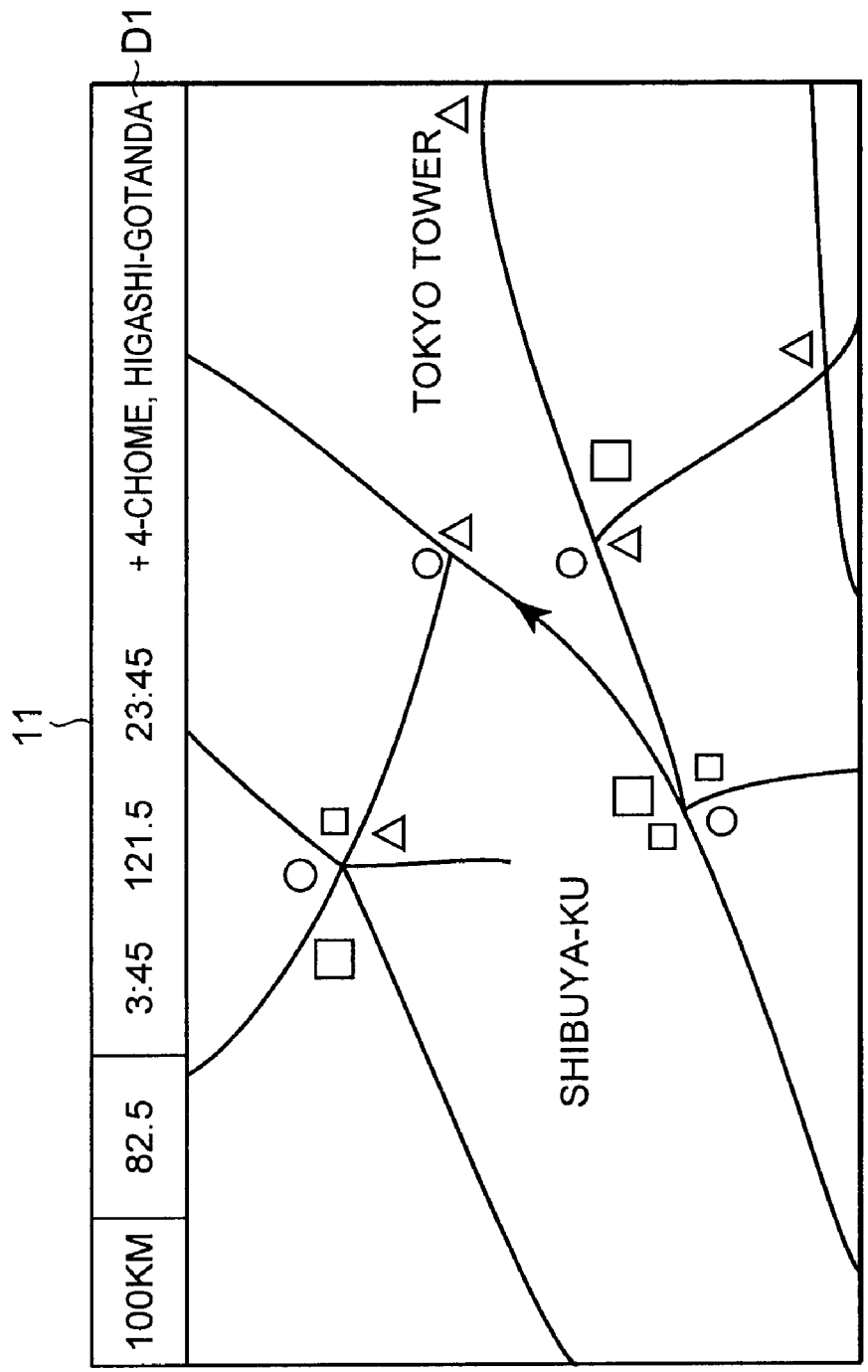
FIG. 9 is a plan view showing a map display in the in-vehicle equipment of FIG. 1.

On the other hand, FIG. 9 is a plan view showing a main display screen of a map. When the menu M4 relating to maps is selected on the program menu screen, the controller 33 displays a map around the current position. It also displays information D1 related to this map display at a strip region on the upper end of the screen. Alternatively, when the user previously instructed navigation processing, the controller 33 displays information relating to the navigation together in this strip region.

In this previous setting, a menu screen shown in FIG. 10 is displayed and executed by the operations of the menu operator 15P disposed on the panel, and the menu operator 15R disposed at the remote commander 40. On this display screen, a destination input menu or the like that is the menu of the uppermost hierarchy in the menus relating to navigation is displayed on the left side. The menus of a lower hierarchy selected from the menus on the left side are displayed at the center, and the menus of a further lower hierarchy are displayed on the rightmost end. FIG. 9 shows the state in which a place menu is selected on the menus of this upper hierarchy, and then a genre menu corresponding to this place menu is selected.

The controller 33 is configured to accept the input of a destination through the selection of the menus in this hierarchical structure, and execute processing of a route search from the current position to the destination, and guide the user in accordance with this route. Also in this case, the menus of the three hierarchies are displayed at the same time. Therefore, for example, in a case where a user erroneously selects the genre menu, it is configured so that the user can directly select the menus of peripheral facilities search and the like, depending on the operation of the touch panel 39. On the other hand, in a case with the remote commander 40, it is configured such that a desired menu is selectable by switching focuses in sequence and tracking the hierarchical structure.

In the in-vehicle apparatus 1, the above-mentioned control bar display/non-display can be set per menu of the menus M1 to M8, as well as split ratio on dual screen display to be described later, by the operation of the setting menus on this display screen.

The display screen of FIG. 9 is a display screen when the navigation processing is executed under such setting. Although in the example of FIG. 9, the surroundings of the current position are displayed by map, various displays such as display in the form of birds-eye view, etc. are selectable on this display.

The controller 33 displays a scale of the map currently being displayed on the left side end in the strip region. Also, it displays a receiving frequency of VICS, currently set so as to obtain congestion information, and current time. Subsequently, it displays a distance to the destination and an estimated arrival time at the destination, which is information related to navigation. In addition, information relating to the current position is displayed by a mark "+" indicating an intersection and the name of location. In a case where the user did not instruct processing of navigation, the display of information relating to navigation is suspended in this strip region.

Figure 11:
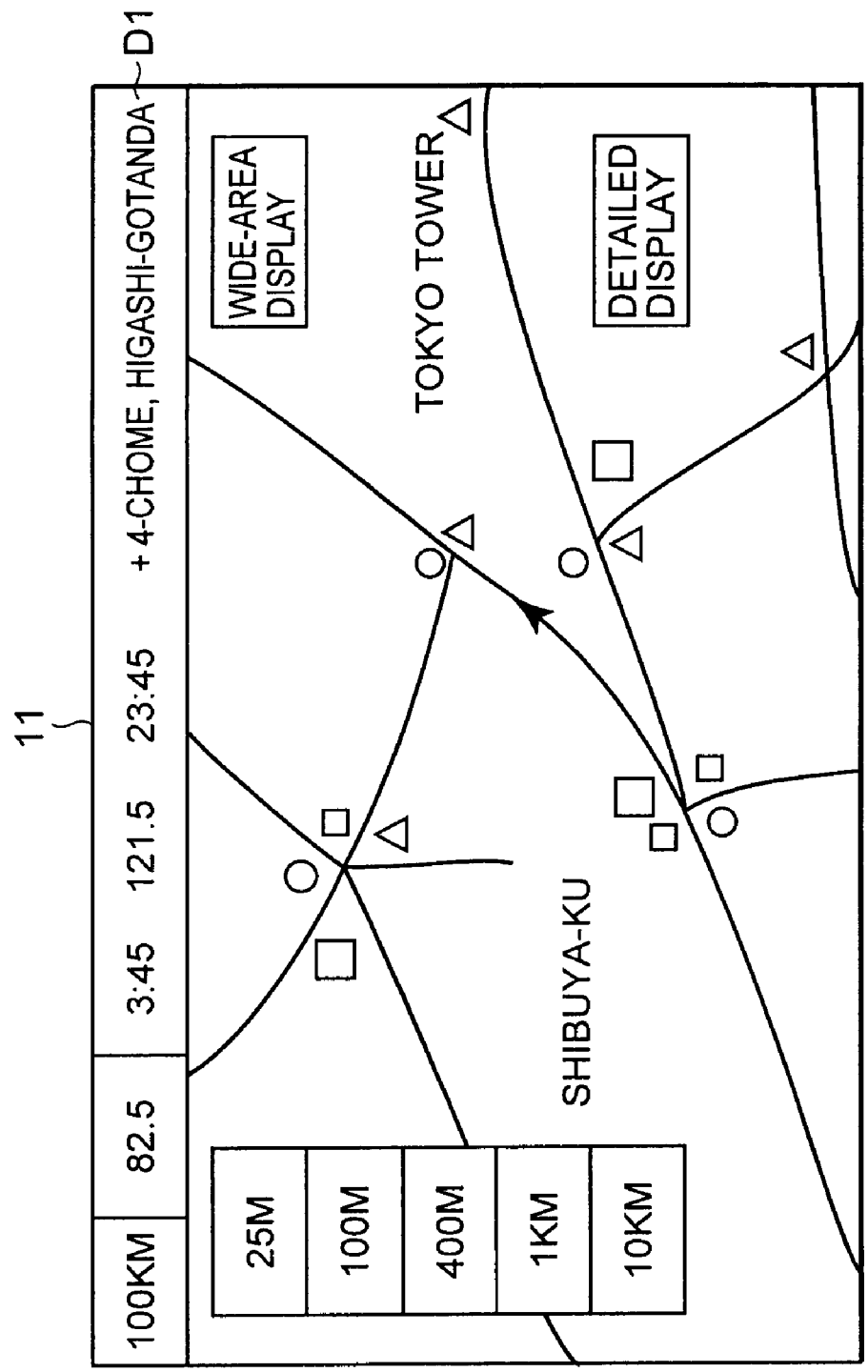
FIG. 11 is a plan view for explaining menus in the main display screen of FIG. 9.

When the information D1 relating to the display of maps is displayed as described above, and the display relating to scale is operated through the operation of the touch panel 39, the controller 33 displays the menu of switchable scales, the menu of a wide area map, and the menu of a detailed map, as shown in FIG. 11, and switches the scale of map display when the scale menu is selected through the operation of the touch panel 39. Alternatively, if the menu of the wide area map or the menu of the detailed map is selected, the scale of map display is switched stepwise in sequence, in accordance with the setting of this scale menu. Relating to this, when the zoom-up and zoom-down operator 42 is operated through the remote commander 40, in the state of displaying the menus such as scales, or in the state of not displaying the menus such as scales, the controller 33 switches the scales of map display stepwise in sequence, in the same manner as the case where the menu of wide area or the menu of details is selected, respectively.

Alternatively, if the user touches with his/her finger on a map display through the operation of the touch panel 39, the map display is moved such that the finger-touched portion becomes the center of the map. Alternatively, if the joystick 43 is operated in the remote commander 40, the map is scrolled in the direction of operation of the joystick 43. Alternatively, when the current position operator 44 is operated in the remote commander 40, the display of the map is switched such that the current position is located at the center of the screen. Accordingly, the in-vehicle apparatus 1 is configured such that the map display can be switched variously through the remote commander 40 or through the touch panel 39.

Figure 12:
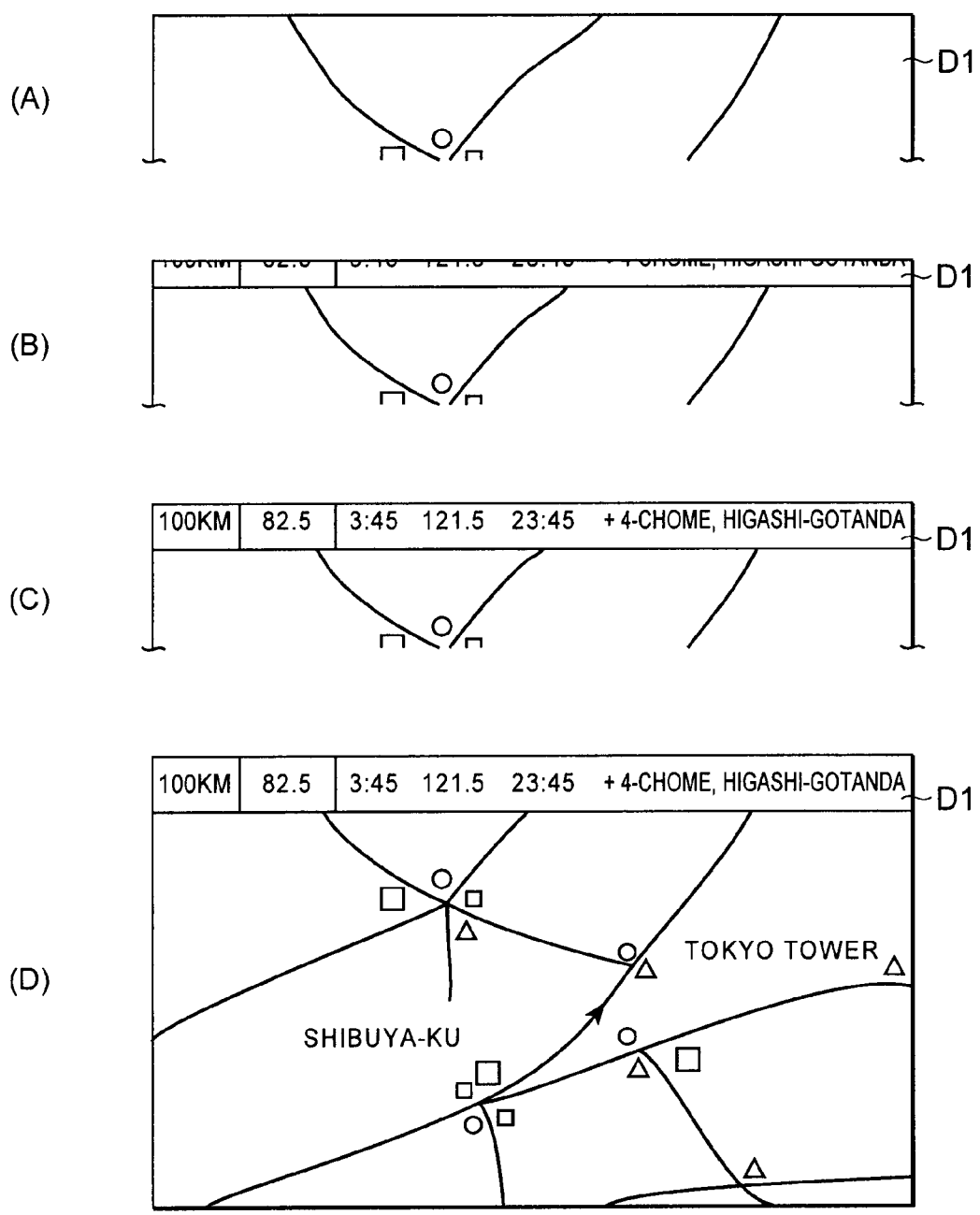
FIG. 12 shows plan views for explaining an information display in the main display screen of FIG. 9.

In the in-vehicle apparatus 1, on the display screen relating to this map display, the display of the information D1 relating to the map display is terminated by the setting on the menu screen as above described with reference to FIG. 10. Thus, while configuring so as not to display the information D1 relating to the map display, in the navigation processing, the information D1 related to the map display is displayed at the timing with reference to a guide point that is a reference point used in route guide, as shown in FIG. 12, and voice guide is provided to the user at a predetermined timing. Specifically, this timing is, for example, timing prior to a predetermined time at which the arrival of the guide point is estimated. Also in this case, the controller 33 provides the user various information by gradually switching displays, as if the display of the information D1, which has been hidden till then on the outside of the display screen, appeared on the display screen 11, as indicated by the changes at the time of starting the display in the order of FIG. 12(A) to FIG. 12(D).

Alternatively, in the state where the information D1 relating to the display of map is not displayed as above, when the user operation relating to the region displaying the information D1 is detected with the touch panel 39, the information D1 is displayed.

Therefore, also in this case, the in-vehicle apparatus 1 is configured such that the displayable region is effectively used to provide the user the information relating to maps.

On the other hand, the main display screen relating to the AUX input menu M5 is formed according to the content relating to the AUX input, in the same manner as the above-mentioned display screen relating to the viewing of video content and the above-mentioned display screen elating to the listening to music content, which are recorded in the hard disk drive 35. Also in this case, the display screen 11 is effectively used in order to prevent deterioration of usability to user, by configuring such that the control bar B1 is not displayed as required, or displayed as required.

On the other hand, the main display screen relating to the Internet menu M6 is formed by displaying web pages and the like, together with the menus of forward, backward, and the like. The display screen relating to the electronic mail menu M7 is formed by displaying the menus of incoming mails, sent mails, mail creation, and the like. It is configured such that contents are displayed by the selection of each mail, or a mail creation screen and the like are displayed. The main display screen of the menu M8 relating to still images is formed by displaying a menu for operation relating to still images, together with the thumbnail images of respective still images. By the selection of the thumbnail image, the corresponding still image is displayed in an enlarged scale. Alternatively, the selection of the menu enables to execute the display of a slide show, and the like.

Also on these display screens, the controller 33 is configured to accept selection of the menu by the operation through the touch panel 39 and the operation through the remote commander 40, and further accept display switching and the like.

In selecting the menus M1 to M8 through this program menu screen, when a menu other than the menus M1 to M3 for providing contents is selected by user, under conditions where contents is being provided to the user by any one of sources, the controller 33 continues to execute provision of the contents, and starts processing relating to the menu selected by the user. This enables the in-vehicle apparatus 1 to execute processing of checking electronic mails or the like, while enjoying music, for example.

On the other hand, in selecting the menus M1 to M8 through this program menu screen, when other menu for providing contents is selected, under a condition where content is being provided to the user by any one of sources, the controller 33 suspends providing of the content provided to the user until then, and plays back the content selected by the user. Thereby, in the in-vehicle apparatus 1, the source relating to these contents can be switched by displaying the program as above described with reference to FIG. 4 or FIG. 5, and selecting the menus M1 to M3.

Even by the press-operation of the source operator 13P disposed on the control panel, or the source operator 13R disposed at the remote commander 40, instead of the operation through this program menu screen, the controller 33 starts the operation of the corresponding application and also switches the application, as in a case where the menus M1 to M3 relating to the source of content are operated.

Figure 13:
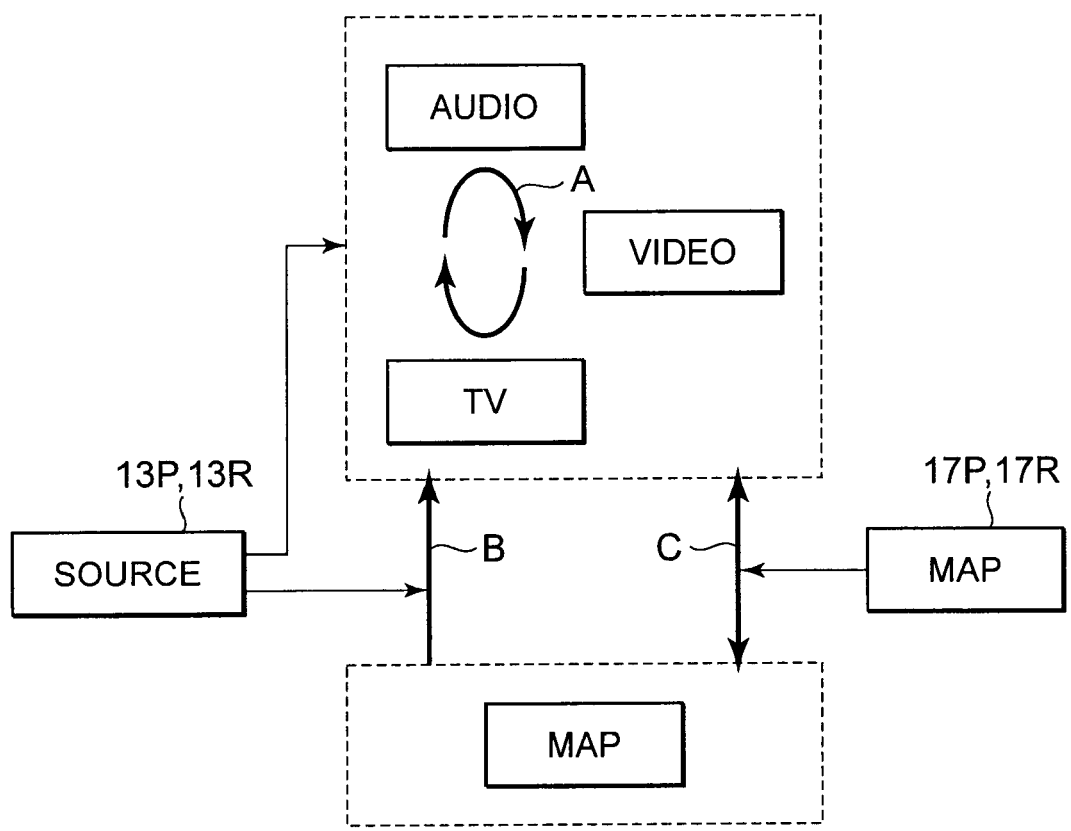
FIG. 13 is a schematic diagram for explaining operations of a source operator and a map operator.

In other words, the controller 33 starts the operations of respective units in the same state as the time of turning power down, by the user's operation of the power switch 12. In a case where this state is the state where content is provided to the user by the application of any one of the menus M1 to M3, the controller 33 switches sequentially and cyclically the source provided to the user, in response to the operation of the source operators 13P, 13R, as indicated by an arrow A in FIG. 13. In FIG. 13, "Audio" and "Video" denote the applications relating to music content and video content recorded in the hard disk drive 35, respectively, and "TV" denotes the application relating to television broadcasts.

On the other hand, when the operations of respective units are started in the same state as the time of turning power down, and this state is not caused by the application relating to the menus M1 to M3, the most recently used application is restarted in accordance with the record of so-called last memory, in a state at the point where the use is suspended. Also in this case, the display relating to the started application is preferentially displayed on the display screen 11. Therefore, as indicated by an arrow B in FIG. 13, when the source operators 13P, 13R are operated with no content provided and with a map displayed, the controller 33 is configured to switch the display of the map to the display relating to content, and start to provide the content.

Thereby, in the in-vehicle apparatus 1, desired content can be selected easily by only repeatedly doing press-operation of the source operators 13P, 13R, so that usability is improved to that extent.

On the other hand, when the map controller 17P disposed on the control panel, and the map operator 17R disposed in the remote commander 40 are operated under a condition where certain content is provided to user, the controller 33 starts the application relating to the menu M4, and switches the display of the display screen 11 to the display of a map, as indicated by an arrow C in FIG. 13. Thereby, in the in-vehicle apparatus 1, the present position and the like can be confirmed easily only by operating the map operators 17P, 17R, under a condition of enjoying video content by television broadcasts, video content and music content recorded in the hard disk drive 35.

Thus, the controller 33 displays a map by the operation of the map operators 17P, 17R, and switches the display of the display screen 11 to the display of content when the map operators 17P, 17R are operated again. Thereby, in the in-vehicle apparatus 1, repetitive operation of the map operators 17P, 17R enables to switch between display/non-display of a map. This also leads to improvement in usability.

In the display switching by the map operators 17P, 17R, and the display switching by the source operators 13P, 13R, it is set so as to transit, not only from a state where the main display screen of each application is displayed, but also from, for example, a lower hierarchical screen relating to the display of list and the like. This also leads to improvement in usability in urgent confirmation of the current position and the like.

The controller 33 also switches displays between the application relating to provision of content and the application of maps, when the user operates the display operators 16P, 16R, which are operators for switching displays. At this time, if no content is being provided to the user, it starts the most recently used application relating to provision of contents, in accordance with the record of the last memory, and switches displays.

Figure 14:
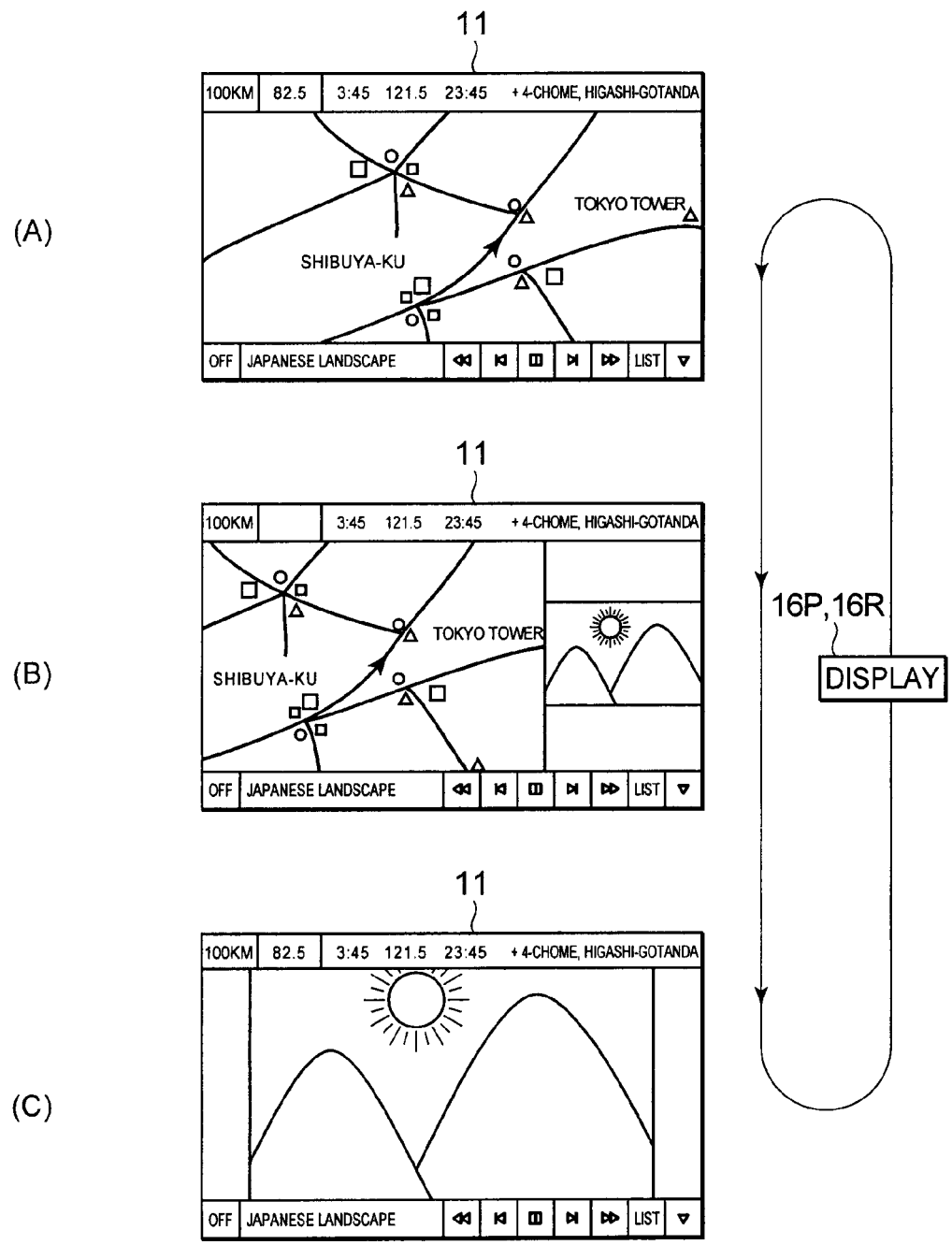
FIG. 14 shows schematic diagrams for explaining an operation of a display operator.

As shown in FIG. 14B, at this time, while a dual screen display, in which the displays relating to two applications are aligned and displayed concurrently, is interposed by the previous setting with use of the menu screen (FIG. 10), it switches the displays sequentially and cyclically by the operation of the display operators 16P, 16R. In the application of the menu M3 relating to provision of music content, the display of such a dual screen display is omitted because this is not provision of content composed of images. Thereby, in the in-vehicle apparatus 1, the processing of checking a map relating to navigation, and the like is executable easily, while checking, for example, the running commentary of television broadcasts by merely switching the display screen 11.

As shown in FIG. 14(A), in a case where the dual screen display is instructed by the user, when the display operators 16P, 16R is press-operated by the user, for example, under a condition where a map is displayed, the controller 33 switches the display of the display screen 11 to the dual screen display, and reduces the image relating to provision of content on the right side, and displays the map at the remaining region on the left side. Subsequently, when the user operates the display operators 16P, 16R, the controller 33 switches the dual screen display to contents provision screen, as shown in FIG. 14(C). The controller 33 is configured to display the original map display screen when the user further operates the display operators 16P, 16R.

On the other hand, in a case where the user does not instruct the dual screen display, the controller 33 skips the dual screen display, and switches between the display of a map and the display of contents, in response to the operation of the display operators 16P, 16R.

In the dual screen display displayed in this way, the controller 33 sets the display size of each screen in accordance with the split ratio previously set using the menu screen (FIG. 10). This enables to execute concurrently the displays of such two applications, thereby improving usability to the user.

Figure 15:
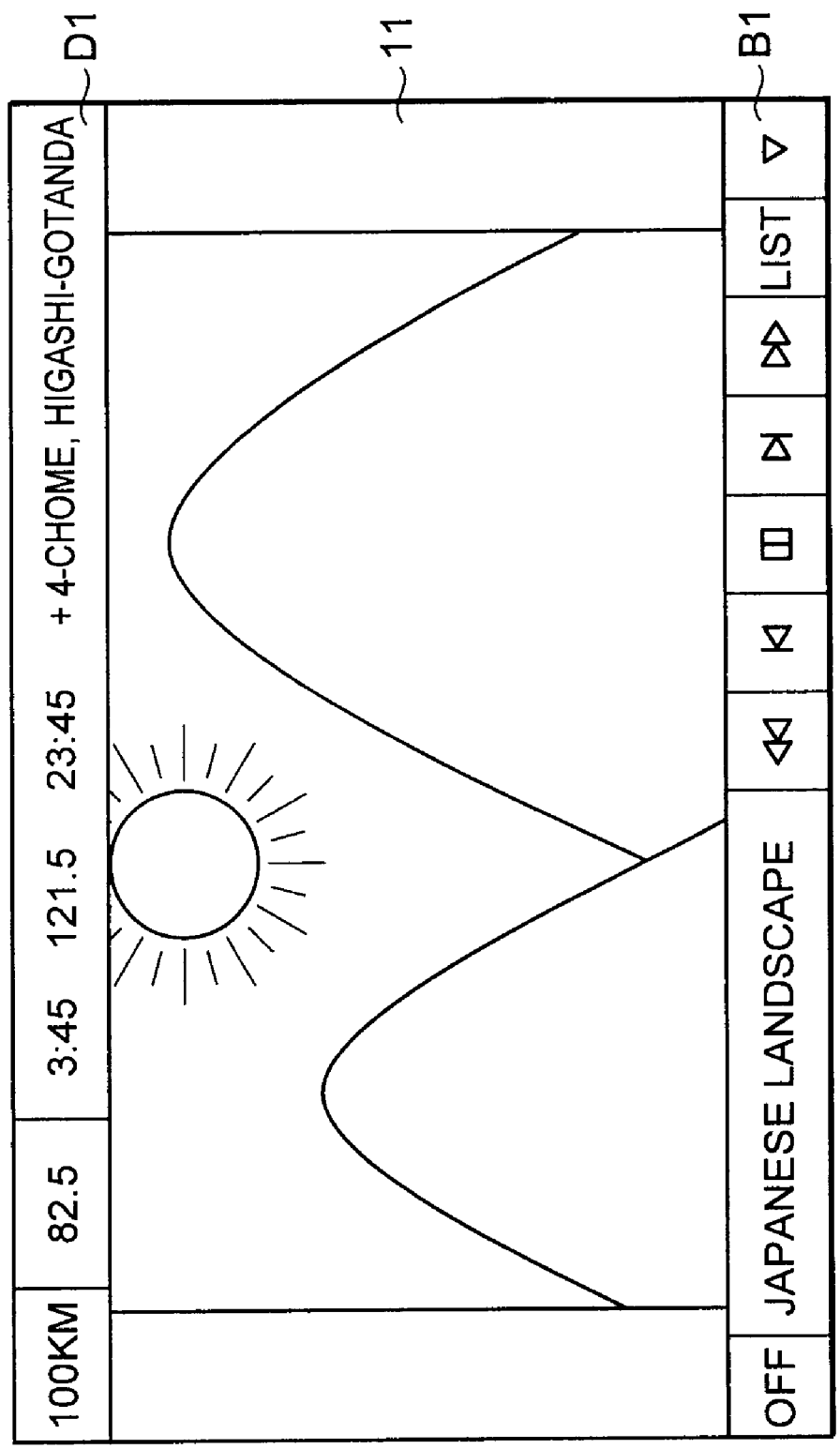
FIG. 15 is a plan view showing a display screen relating two applications.

FIG. 15 is a plan view showing a display screen at the time of switching displays between a map and content. This display is applicable to a map screen, a content provision screen, and a dual screen display, when the display is switched between a map and a content provision screen, by the operation through the source operators 13P, 13R, and the map operators 17P, 17R, as described above with reference to FIG. 13, and the display operators 16P, 16R as described above with reference to FIG. 14. The example shown in FIG. 15 is a case to which the content provision screen is applied.

The controller 33 displays the information D1 related to the map display and the control bar B1 relating to provision of content, at upper and lower ends on this display, respectively. Thereby, in the in-vehicle apparatus 1, it is able to check a variety of information related to the current position and navigation, even while viewing content, for example. As described above with reference to FIG. 6, etc., the operations of the menus through the control bar B1, the touch panel 39 relating to the display of the information D1 related to map display, and the remote commander 40, are accepted in the same manner as in the case of separately starting applications.

On the other hand, in a case where non-display of the control bar B1 and the information D1 related to map display is selected by the setting by the user, in a case where the region for displaying the information D1 related to map display is operated through the touch panel 39, the controller 33 displays the information D1. To the contrary, when the control bar B1 side is operated through the touch panel 39, it displays the control bar B1. Additionally, various operations by the user are accepted via this display. Here, the transitions from the non-display state to the display of the control bar B1 and the information D1 related to map display are carried out in the same manner as described above with reference to FIG. 7, FIG. 12, respectively.

On the other hand, in the operation through the remote commander 40, it displays concurrently the control bar B1 and the information D1 related to map display by the operation of the center jog 46, and switches focuses between the display of the control bar B1 and the display of the information D1 related to map display, in response to the operation of the center jog 46.

Thereby, even when executing two applications at the same time, the displayable region of the display screen 11 is effectively used so as to accept the operation of the user in the in-vehicle apparatus 1. The example shown in FIG. 15 is a case, meanwhile the map application and other application are being executed concurrently, where the other application side is mainly displayed. In a case of displaying the map side, or in a case of the dual screen display, the control relating to the displays of the control bar B1, and the information D1 related to map display is executed similarly.

Even in a case where the operation is terminated by any operation of the user, with regard to the respective applications corresponding to the menus M1 to M8, the controller 33 records and holds, per application, the state when the operation terminates. In the activation of each application, it reproduces the state immediately before termination, in accordance with this record. Specifically, with regard to the applications of the menus M1 to M3 relating to contents provision, the controller 33 records the most recently played back file name, and the position at which the playback is suspended, per application (i.e., per source, in this case). With regard to the source relating to video content, there is recorded as to whether it was the dual screen display or not, and whether the control bar B1 was in non-display or not, and whether it was the main screen or the list screen, at the point of time that the content provision was suspended.

In a case of switching sources sequentially and cyclically by the above-mentioned operation of the source operator, the controller 33 displays, for example, the content of television broadcasts by the dual screen display, by starting each application in accordance with this record. In this state, when the user operates the source operator, it displays the video content recorded in the hard disk drive 35, on the overall of the display screen, and the like. Thus, even in a case of switching sources sequentially and cyclically, it is configured so as to perform image display in the form to meet the preference of user. Accordingly, in this case, the control bar B1 is to be displayed or not displayed, per content. Depending on the content, the list screen is to be displayed.

With regard to a specific operation among various operations relating to such displays, which are assigned to the center jog 46, the controller 33 also accepts the operation through a side jog 52. Specifically, the controller 33 accepts, through the side jog 52, the operation relating to contents provision among the operations accepted through the center jog 46. Additionally, it accepts the operation of the source-off operator 54, and the backward operator 53, which are disposed on the side surface in relation with the side jog 52, together with the side jog 52. Here, the source-off operator 54 is an operator for instructing the termination of the contents-related application in the course of drive. The backward operator 53 is an operator for instructing the same operation as the back operator 48 disposed next to the center jog 46.

Thereby, in the in-vehicle apparatus 1, the operation relating to specific contents provision can be operated with the operators disposed on the side surface of the remote commander 40, by so-called blind touch, so that usability is improved to that extent.

Specifically, when the side jog 52 is rotationally operated in a case of providing music content to the user, the controller 33 executes processing of so-called title skipping in the direction in which the side jog 52 is rotationally operated. Alternatively, when the side jog 52 is press-operated, it switches the display to the list screen. In this state, it switches focuses and accepts the selection of content by the user, by the operation of the side jog 52, and then switches the display to the original screen by the operation of the backward operator 53.

On the other hand, in providing content by television broadcast, it switches the receiving channel by the rotational operation of the side jog 52. In providing video content recorded in the hard disk drive 35, it executes skip processing in the direction of operation in the units of predetermined time, by the rotational operation of the side jog 52.

(2) Operation in Embodiment

With the foregoing configuration, by mounting the in-vehicle apparatus 1 (FIG. 1 and FIG. 2) on the in-vehicle cradle 2A disposed in a vehicle, the in-vehicle apparatus 1 receives the supply of power from the vehicle, and is connected to the external unit 21, and the car audio equipment 28, etc., which are disposed in the vehicle, thereby making it possible to use the in-vehicle apparatus 1 in the vehicle. In the in-vehicle apparatus 1, by the operation of the power switch 12, the power is turned on so as to be used for navigation, and enjoy music and video content, and content by television broadcasts, further check the current position.

In the in-vehicle apparatus 1 that is so used for enjoying contents and checking the current position and the like, the program menu screen that is a menu of available applications is displayed (FIG. 4, FIG. 5) by the operation of the remote commander 40 (FIG. 3), or the operation of the touch panel 39 disposed on the display screen 11. A desired application is activated by the selection of the menu on this program menu screen. This enables to enjoy, for example, the content by television broadcasts. This also enables to start a plurality of applications and display, for example, a map in order to check the current position, while enjoying music, for example.

On the main display screen of each application so displayed by selecting the application, a menu toward the list screen relating to the selection of content, and the like are displayed, or various menus relating to the playback of content, and the like are displayed. Then, by the operation of the touch panel 39, or the operation of the remote commander 40, various operations, such as switching of content by selecting these menus, are executable (FIG. 6 to FIG. 12).

Therefore, in a case of selecting applications by the operations through the touch panel 39, or the remote commander 40 in a series of the foregoing operations described above, because it is a processing for selecting a desired menu from a plurality of menus that are displayed on the screen of program menus, in the operation through the touch panel 39, it is able to execute by finding the desired menu and merely touching it with a finger. Thereby, in the in-vehicle apparatus 1, it is configured to be operable through the touch panel 39 as well as through the remote commander 40, so as to simplify the operation with regard to the touch panel.

However, in the operation through the remote commander, it becomes necessary to move the focus and input a decision operation. In addition, the in-vehicle apparatus 1 is most frequently used in a case of enjoying contents and a case of confirming the current position on a map. Further, in the in-vehicle apparatus 1, as the case of enjoying contents, video content via television broadcasts, music content and video content recorded in the hard disk drive 35 are selectable, however, with regard to the contents relating to these three different sources, it can be said to be extremely rare that a user desires to enjoy them at the same time. To the contrary, with regard to a map, there may be a case where it is frequently used for display while enjoying the contents.

Thereby, in the in-vehicle apparatus 1 (FIG. 13), the source operators 13P, 13R for instructing the switching of sources are provided in the touch panel and the remote commander 40, respectively, so as to provide these three sources to a user by sequentially and cyclically switching by operation through the source operators 13P, 13R. In a case where no content is provided, after activation of the application relating to these sources, the sources are sequentially switched by repetitive operations thereof. At this time, in a state of displaying the map, which is a display related to navigation and the like, when the source operator 13P, 13R is operated, the display of the map is switched to the display of video content. Thereby, in the in-vehicle apparatus 1, even in a case where the operation is switched from the map display to the content reproduction, the display can be switched in the same manner as the case of switching the sources. Accordingly, with regard to the operation through the remote commander 40, the operation related to switching of sources can be simplified to that extent.

Further, in a state of displaying video content, when the map operator 17P, 17R for instructing a display of map is operated, the display of the video content is switched to the display of a map. Still further, in a state of displaying the map, when the map operator 17P, 17R is operated, the display of this map is switched to the display of the original video content. Thereby, in this in-vehicle apparatus 1, in switching the display to the map by the operation of the map operator, it is also possible to switch the display from the display of the map to the display of a source by the operation of this operator as well.

Thereby, by the operations of the source operator relating to the source switching and the map operator for instructing the map display, it is able to switch the display between the source and the map, thereby enabling to simplify the operation relating to the remote commander 40 to that extent.

Thereby, in the in-vehicle apparatus 1, even in a case where operation is accepted by the operation through the touch panel and through the remote commander, it is able to eliminate a burden on the user, improve operability, and switch the display by a so-called blind touch, accordingly improving usability to the user.

Alternatively, in the in-vehicle apparatus 1, by the operation of the display operator 16P, 16R (FIG. 14), the display is switched between the map and the video content, at this time, in response to the setting by the user, the display of the display screen 11 is switched sequentially and cyclically, with a dual screen display interposed, in which the display of a map and the display of video content are aligned and displayed. Thereby, for such a case of enjoying only a voice relating to a video content while checking the current position, for example, by a map, or for a case of confirming both of the map and an image of the video content, and the like, it is able to display the video content and the map in the form of display matching to the taste and preferences of the user.

At this time, by permitting switching of these three displays sequentially and cyclically merely by operation through the display operator 16P, 16R, it is able for the user to select a desirable display mode by a simple operation with the remote commander 40, and further by a simple operation of the operators provided on the operation panel, thereby enabling to improve usability to that extent.

Thus, in the in-vehicle apparatus 1, a ratio of display of two images relating to the dual screen display is preset and accepted so as to form the dual screen display in accordance with the preset ratio. Thereby, in the dual screen display, in case where the map is main for the user, it is possible to enlarge the display of the map side, alternatively, in a case where the video content is main, it is possible to enlarge the display of the content side, thereby enabling to improve usability to the user by reflecting taste and preferences of the user on the dual screen display.

Further, in such setting, it is accepted per source, and a dual screen display is formed on the basis of this accepted setting per source. Thereby, with regard to the content relating to, for example, television broadcasts, it is displayed by a dual screen display with the map as a main, and with regard to video contents recorded in the hard disk drive 35, it is displayed by a dual screen display with the video content as a main, and the like, thus a display mode that the user desires can be set per source, thereby also enabling to improve usability.

In addition, as to whether or not such a dual screen display is to be displayed can be set by the user per source, thereby enabling to further improve the usability.

Further, in the in-vehicle apparatus 1, because the display modes are switched by the operation of the display operator 16P, 16R as described above, whether a previous display is the dual screen display or not is retained in record regarding to each source. Accordingly, in the display of each source through the operation of the source operator, the map and the video content are displayed via the dual screen display or only the content image is displayed according to this record. Thereby, it is possible for the user, without the need of selecting a desired display mode by the operation of the display operator 16P, 16R one by one per source, to activate an application by the operation of the source operator 13P, 13R to obtain a display in a desired display mode, accordingly simplifying the operation through the remote commander 40.

Figure 6:
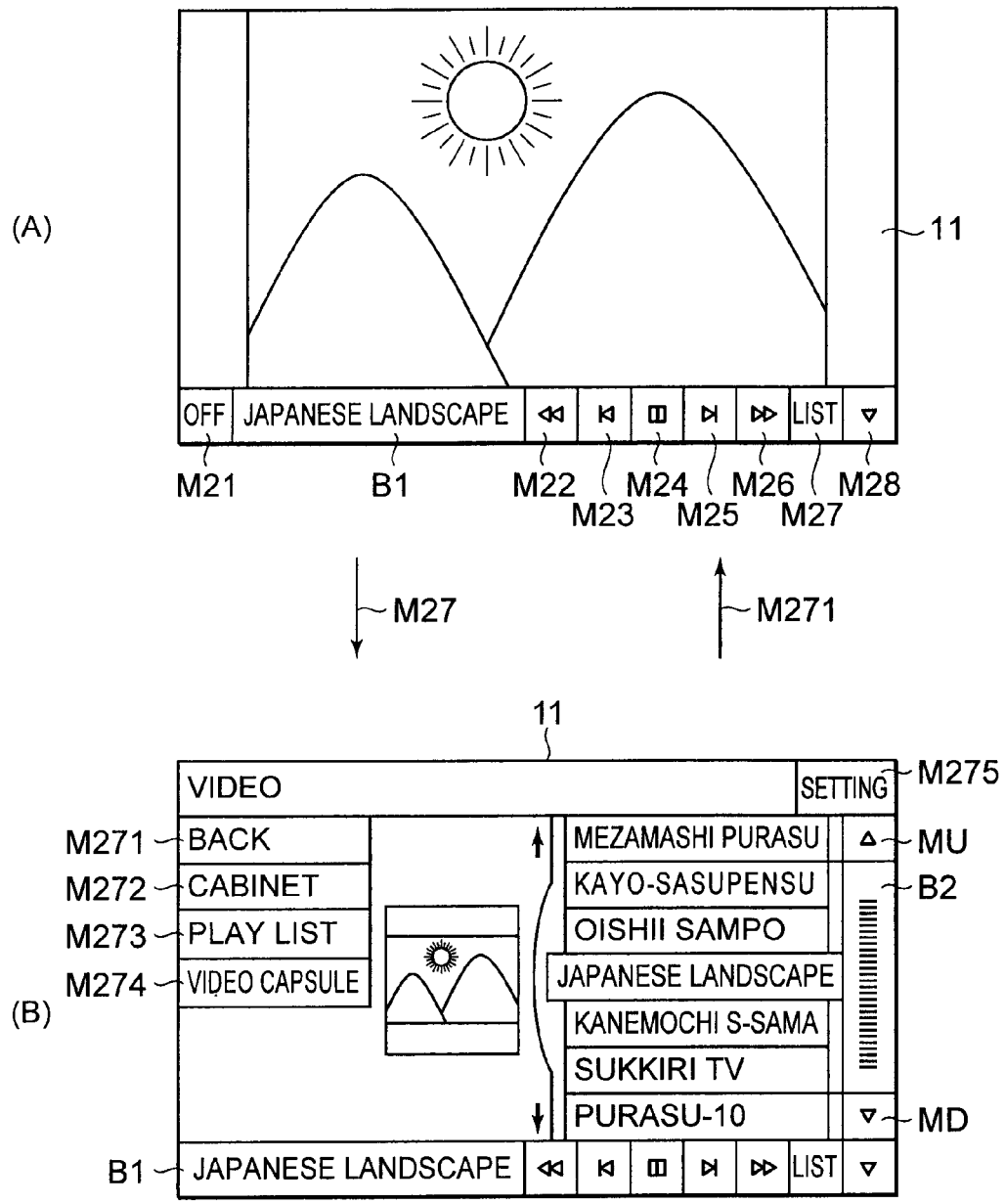
FIG. 6 shows plan views showing a main screen and a list screen in relation to provision of video content in the in-vehicle apparatus of FIG. 1.

Therefore, in such a case where the user reselects a content upon enjoying the content as described above, and the like, by selection of a menu in the control bar B1 displayed on the main screen of each application, and the like, a corresponding list screen is displayed, then by selection of a menu in this list screen, it is configured to select a desired content (FIG. 6, FIG. 8). At this time, in this in-vehicle apparatus 1, in order to be able to easily select desired content from a plurality of contents recorded in the hard disk drive 35, menus guiding toward the selection of respective content are displayed in a hierarchical structure, such that by selecting of a genre, for example, it is configured to select desired content from a list of the genre related to the selection.

Also, when inputting a destination or the like relating to navigation, a category which can be selected easily from various categories classifying destinations is selected, then a detail category corresponding thereto is selected from a list of detail categories relating to this category, thereby, also in this case, the destination is inputted by selection of menus in a hierarchical structure (FIG. 10).

In this in-vehicle apparatus 1, in the menus with such a hierarchical structure, menus of an upper hierarchy and menus of a lower hierarchy corresponding thereto are displayed at the same time, wherein, as to the operation through the touch panel 39, selection of any menu from the menus of the upper hierarchy and the menus of the lower hierarchy which are displayed concurrently is accepted. Further, in a case where a menu in the upper hierarchy is selected by acceptance of this selection, the menu of the lower hierarchy is switched to menus corresponding to the menu of the upper hierarchy so selected. Therefore, in the operation of the touch panel, only by the operation of selecting a desired menu merely by moving a viewing point, it is able to select the desired menu, and if necessary, to select a menu in the lower hierarchy again, thereby enabling, by the operation through the touch panel 39, to activate the desired menu selecting from the menus in the hierarchical structure, quickly and reliably.

To the contrary, with regard to the operation of the remote commander 40, by operation of the back operator 48, which is an operator toward the upper hierarchy for instructing switching the focus to the upper hierarchy, then after switching the focus from the lower hierarchy to a menu of the upper hierarchy corresponding thereto, by a rotational operation of the center jog 46, which is a focus switching operator for switching focuses in menus relating to the same hierarchy, the focus is switched in the menus in the upper hierarchy. Further, by the press-operation of the center jog 46, which is a selection operator for instructing selection of a menu which is focused, the display of menus in the lower hierarchy is switched to the display of menus corresponding to the menu in the upper hierarchy which is focused. Thereby, in the operation through the remote commander 40, by switching the focuses in a manner so as to track the hierarchical structure via the operation of a plurality of operators, the desired menu can be selected reliably.

Thereby, by displaying the menus configured to be suitable for operation through the touch panel 39 as well as for operation through the remote commander 40, it is enabled to accept the operation of a user through the touch panel 39 and the remote commander 40, so as to be able to improve usability to the user in accordance therewith.

Further, because there are displayed the menus of the upper hierarchy and the menus of the lower hierarchy corresponding thereto at the same time in the manner as described above, and in the case where all of the menus cannot be displayed, the menu for instructing scroll is displayed together, thus as to the operation through the touch panel, by the operation of the menu for instructing scroll, the menus that could not be displayed are displayed by scroll. Further, as to the operation through the remote commander 40, by the operation of the focus switching operator, the menus that could not be displayed are displayed by scroll. Thereby, with the same feeling of operation as the operation through the remote commander 40, the touch panel 39 is operated so as to select the menus that could not be displayed, thereby enabling to improve usability in accordance therewith.

Further, because that the focus switching operator and the selection operator described above is a rotary operator which is press-operable, and that the operation with the focus switching operator is a rotating operation of this rotary operator, and the operation with the selection operator is a press-operation of this rotary operator, it is able to select menus in the direction of the lower hierarchy only by repeating the rotary operation and the press operation of this rotary operator, thereby enabling to improve usability to the user.

Further, with regard to the operation of the control bar B1 in which the menu relating to the display of the list screen is disposed as above described, in order to accept the operation of a user through the center jog 46, which is the rotary operator, there are provided the side jog 52 corresponding to the center jog 46 and the backward operator 53 on a side surface of the remote commander 40. Thereby, in the in-vehicle apparatus 1, there are provided on a main operation surface of the remote commander 40 at least a main rotary operator and a main backward operator, and on a side surface of this main operation surface, there are provided a sub rotary operator, and a sub backward operator for instructing to return to an original state from a state set up by the sub rotary operator.

Also, by the operations through the main rotary operator and the main backward operator, the menus relating to switching of operations between the navigation function and the contents providing function are displayed so as to accept various operations.

In the in-vehicle apparatus 1, by sharing of the functions assigned to the main rotary operator and the backward operator, an operation relating to provision of contents which is a part of these functions is configured to be accepted also by the operation through the sub rotary operator and the sub backward operator. Thereby, in the in-vehicle apparatus 1, among the operations assigned to the main operator side, an operation thereof which is suitable to blind touch is allowed to be operated also on the sub rotary operator side. Thereby, a certain specific operation is configured to be operable from the sub rotary operator side, accordingly, even in a case where operations through the touch panel and the remote commander are acceptable, and the like, it is able to eliminate a burden on the user, and improve operability as well as usability to the user.

Specifically, in a case of providing music content to a user, by the operation of the sub rotary operator, music contents to be provided to the user is switched so that operations to skip unfavorite contents for reproduction by blind touch is executable, and the like, thereby improving usability to the user.

Also, by displaying the list screen and accepting selection of a music title by the press operation of the rotary operator, it is able to improve usability to a user.

(3) Effect of the Preferred Embodiment

According to the configuration described as above, as it is allowed to switch from the display of map to the display of source even by the operation of the source switching operator, with regard to an apparatus having a navigation function, a video playback function and the like, it is able to improve usability by the user.

At this time, also by the operation of the display switching operator, by allowing switching sequentially and cyclically between the display of a map, the display of reproduced video content and the display of a dual screen display thereof, it is able to improve usability to user accordingly.

Further, by accepting settings of the size of a region in which to display the map and the size of a region in which to display the reproduced video content within the dual screen display so as to form the dual screen display on the basis of this settings, and further by accepting this settings per source so as to form a dual screen display on the basis of the settings corresponding to each source, it is possible to form a dual screen display on which preferences of the user is reflected. Also, by recording and retaining as to whether the last display immediately prior to is a dual screen display or not, and by displaying a dual screen display on the basis of this record, it is also possible to improve usability to the user.

Further, by displaying the menus of the upper hierarchy and the lower hierarchy at the same time, and accepting the operations through the touch panel and the remote commander, it becomes possible to display menus suitable for operation through the touch panel and also through the remote commander, to accept operations of the user through the touch panel as well as the remote commander, thereby improving usability to the user in accordance therewith.

Further, in the case where all of the menus cannot be displayed, a menu for instructing scroll is displayed together, and by causing the remaining menus that cannot be displayed to be displayed by scroll, it is able to select a menu from the remaining menus that could not be displayed by operating the touch panel with the same feeling of operation as the remote commander, accordingly improving usability to the user.

Still further, because that this operator relating to focus switching is the press-operable rotary operator, only by repetition of the rotary operation and the press operation of the rotary operator, it is possible to select menus in the direction of the lower hierarchy, accordingly improving usability to the user.

Also, in addition to the press-operable main rotary operator, the sub rotary operator which is press-operable is provided on the side surface, and by configuring through this sub rotary operator to accept only a specific operation relating to processing of contents among the operations to be accepted through the main rotary operator, it becomes possible, with regard to the operations suitable for blind touch, to operate on the side of the sub rotary operator side, accordingly improving usability to user.

That is, by switching music contents through a rotary operation of the sub rotary operator, displaying the list by press-operation thereof and accepting selection by the user, it is able to select a desired music content easily thereby improving usability to the user.

(4) Other Preferred Embodiments

In the above description of the foregoing embodiments, it is described by way of example of switching the displays between the map and the contents by the operation of the operators, however, the present invention is not limited thereto, and it is applicable widely to such a case where the displays are switched between the contents and still images, in addition to or in place of the map, or the like.

Further, although it is described in the foregoing embodiments by way of example of the case where the sizes of the region in which to display the map and the region in which to display the video content are set up collectively when setting the ratio in the dual screen display, the present invention is not limited thereto, and it may be set up separately.

Further, in the foregoing embodiments, it is described by way of example where setting of regions in which to display the map and the video content in the dual screen display is accepted according to each content, and where as to whether it is a dual screen display or not is recorded per source, however, the present invention is not limited thereto, and it may be configured to display a dual screen display by a default setting by omitting the above-mentioned settings and recording.

Still further, in the foregoing embodiments, it is described by way of example of the case of providing videos and music contents recorded in the hard disk drive, and video contents by television broadcasts, however, the present invention is not limited thereto, and it may be applied widely to such a case of providing various contents from various sources.

Furthermore, in the foregoing embodiments, it is described by way of the case where the selection of the menus and the like are accepted through the rotary operator which is press-operable, however, the present invention is not limited thereto, and it may be applied widely to such a case where the operation through the joystick and the like is accepted.

Moreover, although the foregoing preferred embodiment describes the case of applying the present invention to the in-vehicle apparatus, the present invention is not limited to this case, but applicable widely to various multimedia terminals such as personal digital assistants (PDA) and portable telephones.

(Industrial Applicability)

The present invention relates to the in-vehicle apparatus and the contents provision method, and is applicable to, for example, a multimedia terminal having the function of navigation equipment and the function of video playback.

The invention claimed is:

1. An apparatus which accepts a selection from a hierarchical menu to provide content in accordance with an operation through a touch panel and an operation through a remote commander, wherein:
    said remote commander includes:
        a focus switching operator which switches a focus in a menu of a same hierarchy;
        a hierarchy upward operator which instructs switching of the focus to an upper hierarchy; and
        a selecting operator which instructs selecting of a focused menu,
    said apparatus displays an upper hierarchy menu relating to said hierarchical menu and a lower hierarchy menu corresponding to a selection among said upper hierarchy menu simultaneously, in the operation through said touch panel,
    a selection regarding both of said upper hierarchy menu and said lower hierarchy menu configured to be displayed simultaneously, and
    a display of said lower hierarchy menu is switched to a menu corresponding to a selected upper hierarchy menu in accordance with a selection of said upper hierarchy menu, and
    in the operation through said remote commander, after switching the focus from said lower hierarchy to the upper hierarchy corresponding thereto by an operation of said hierarchy upward operator, the focus is switched in said upper hierarchy menu by an operation of said focus switching operator, and
    the display of said lower hierarchy menu is switched to a display of a menu corresponding to said upper hierarchy menu focused by an operation of said selecting operator wherein a thumbnail image is displayed between said lower hierarchy and said upper hierarchy.

2. The apparatus as claimed in claim 1, wherein:
    in a case where said upper hierarchy or lower hierarchy menu is beyond display in a displayable area, a menu instructing scrolling is additionally displayed,
    in the operation through said touch panel, said menu beyond display is displayed by scrolling by an operation of said menu instructing scrolling, and
    in the operation through said remote commander, said menu beyond display is displayed by scrolling by the operation of said focus switching operator.

3. The apparatus as claimed in claim 2, wherein:
    said focus switching operator and said selecting operator function as a press-operable rotary operator,
    the operation of said focus switching operator is a rotational operation of said rotary operator, and
    the operation of said selecting operator is a pressing operation of said rotary operator.

4. The apparatus as claimed in claim 1, wherein when using said remote commander a focused menu in the lower hierarchy is displayed so as to project left from other menus in said lower hierarchy.

5. The apparatus as claimed in claim 1, wherein a remote commander program menu screen is displayed which shows a plurality of menus arranged in a form of a ring.

6. The apparatus as claimed in claim 5, wherein a selected menu in the remote commander program menu is displayed larger than other menus in the ring.

* * * * *